United States Patent

Iwasa et al.

[11] Patent Number: 5,870,174
[45] Date of Patent: Feb. 9, 1999

[54] VARIABLE DENSITY IMAGE PROCESSING APPARATUS

[75] Inventors: Tadashi Iwasa, Kawagoe; Haruo Kotani, Takatsuki; Makoto Yamaguchi, Tokyo, all of Japan

[73] Assignee: Nishimoto Sangyo Co., Ltd., Osaka, Japan

[21] Appl. No.: 947,318

[22] Filed: Oct. 8, 1997

Related U.S. Application Data

[62] Division of Ser. No. 525,752, Oct. 4, 1995, Pat. No. 5,724, 153.

[30] Foreign Application Priority Data

Feb. 8, 1994 [JP] Japan .......................... 6-36539

[51] Int. Cl.⁶ .......................... G03B 27/32; H04N 1/21
[52] U.S. Cl. .......................... 355/27; 358/298
[58] Field of Search .......................... 355/27, 35, 36, 355/37, 18, 47, 49; 358/298

[56] References Cited

U.S. PATENT DOCUMENTS

| | | | |
|---|---|---|---|
| 3,743,413 | 7/1973 | Sharp | 355/29 |
| 4,303,948 | 12/1981 | Arai et al. | 358/287 |
| 4,870,450 | 9/1989 | Higashi | 355/27 |
| 4,899,227 | 2/1990 | Yamada | 358/452 |
| 4,980,706 | 12/1990 | Someya | 346/160 |
| 5,280,367 | 1/1994 | Zuniga | 358/462 |
| 5,739,896 | 4/1998 | Patton et al. | 355/27 |

FOREIGN PATENT DOCUMENTS

| | | |
|---|---|---|
| 0 435 174A2 | 7/1991 | European Pat. Off. . |
| 51-72235 | 6/1976 | Japan . |
| 51-113483 | 10/1976 | Japan . |
| 58-52550 | 4/1983 | Japan . |
| 62-253267 | 11/1987 | Japan . |
| 63-247241 | 10/1988 | Japan . |
| 64-80168 | 3/1989 | Japan . |
| 1-77640 | 5/1989 | Japan . |
| 2-109173 | 4/1990 | Japan . |
| 3-232073 | 10/1991 | Japan . |

*Primary Examiner*—Russell Adams
*Assistant Examiner*—Hung Henry Nguyen
*Attorney, Agent, or Firm*—Nikaido, Marmelstein, Murray & Oram LLP

[57] ABSTRACT

For forming multiple images on a single sheet of film (F) for medical use, specific data to the film (F) such as a patient name are extracted from one of the images, and the extracted data are enlarged, and the enlarged data are output to an optical processing system, of which exposing position is controlled, and then the data is exposed onto the film (F) in a designated location, for example, at the bottom of the film (F) thereby.

6 Claims, 19 Drawing Sheets

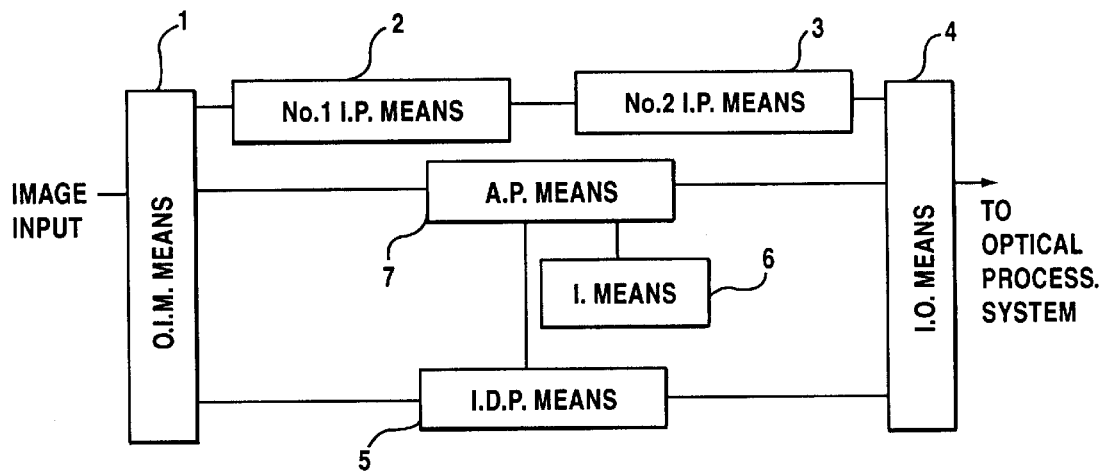
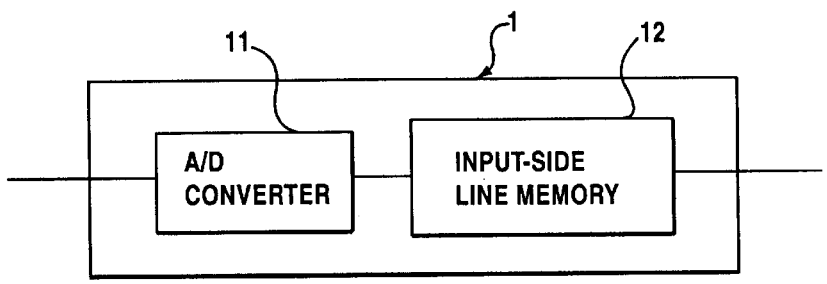
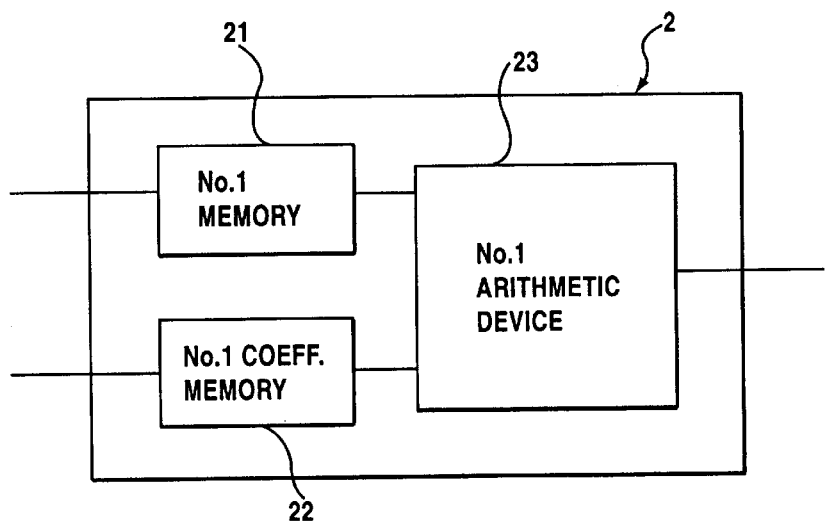

FIG.8
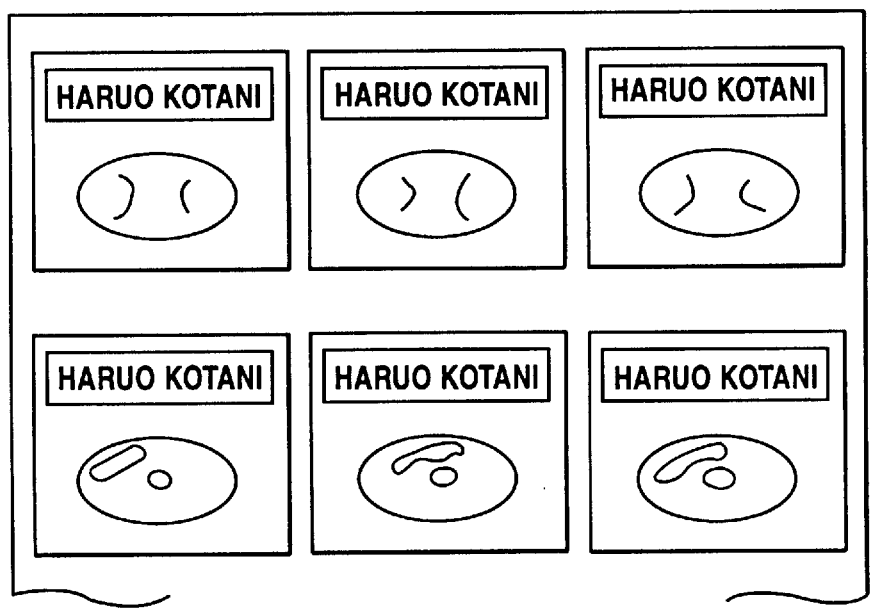
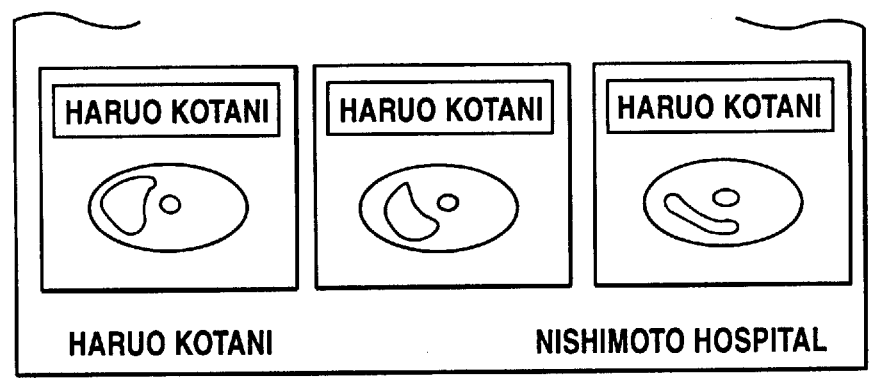

FIG.21
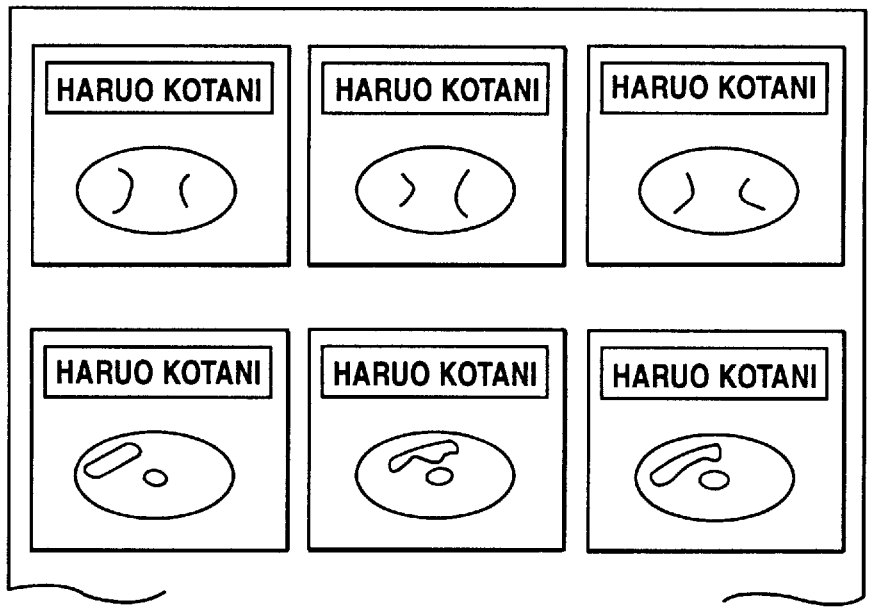
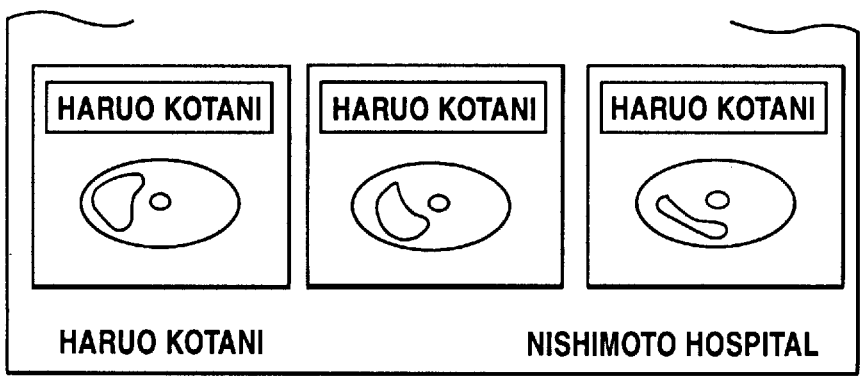

VARIABLE DENSITY IMAGE PROCESSING APPARATUS

This is a division of application Ser. No. 08/525,752 filed Oct. 4, 1995 now U.S. Pat. No. 5,724,153.

TECHNICAL FIELD

This invention concerns a variable density image (grey scale image) processing method and an image processing apparatus which utilizes that method. More specifically, it concerns a variable density image (grey scale image) processing method, and variable density image (grey scale image) processing apparatus utilizing it, which can render identifiable a single-sheet photosensitive medium on which multiple images have been made, by simply and rapidly inscribing identifying information in a designated location on the medium.

This invention also concerns a more compact, lightweight variable density image (grey scale image) photographic apparatus capable of utilizing this variable density image (grey scale image) photographic apparatus.

BACKGROUND ART

In the medical field, an image created by imaging technology such as X-ray computed tomography (CT), scanning-type nuclear magnetic resonance imaging (MRI), and digital subtraction angiography (DSA), after being converted to a digital image and magnified by a designated multiplier by means of a variable density image (grey scale image) processing apparatus, is broken down into its constituent graphic elements. The digital image data, containing that image's continuous series of gradients, is converted into a chronological series of analogue signals. An apparatus called a laser imager (hereinafter termed a "variable density image photographic apparatus") then uses a semi-conductor laser apparatus (cf. FIG. 20), employing a direct modulation formula, to irradiate silver-sodium film with these analogue signals, thus making them into photographs.

Each original image includes within it certain data specific to itself, as for example its identification number, patient name, or the date the image was created (cf. FIG. 21). However, the laser beams of the optical systems used in these variable density image (grey scale image) photographic apparatus range between about 80 μm and 100 μm in diameter; in consequence, a written (i.e. alphabetic or numeric) character of the 16-dot size commonly used, for instance, comes out to a size of approximately 1.2 mm when inscribed by such a beam. As a result, a reader cannot decipher the data on the film simply by looking at the film.

Thus, at present, data used for identification of individual films (hereinafter termed "identifying data") is input by means of the variable density image (grey scale image) processing apparatus input apparatus, and is inscribed onto the bottom of the film in a fixed size by means of the optical system; or, alternatively, an identification label is affixed to the bottom of the film following development. Although the data is then readable, the process interferes with the rapid handling of such medical films.

In their typical configurations, the basic constituents of the variable density image (grey scale image) photographic apparatus currently in use are as follows:

(1) a film feeding cassette for storage of film prior to exposure;
(2) a pick-up mechanism to remove the film from the film feeding cassette;
(3) a feeding means for feeding the film removed by this pick-up mechanism to the target location of the laser beam;
(4) an exposure means to expose the film by scanning it while irradiating it with a laser beam;
(5) a film securing means to secure the film;
(6) a secondary scanning means to scan the film in a direction perpendicular to the laser beam's direction of scan;
(7) a retrieval means for retrieving the exposed film;
(8) a film retrieval cassette for storage of film following retrieval;
(9) an image processing means for laser-scan modulation, assembling of image data, and image enlargement and reduction;
(10) a control means for control of laser output and other means;
(11) a power supply means for the controls, for laser output, and for operating the apparatus.

FIGS. 22–26 show examples of variable density image (grey scale image) photographic apparatus configured from the constituents described above.

FIG. 22 depicts a variable density image (grey scale image) photographic apparatus i, consisting of a film feeding cassette a, a film retrieval means b, an exposure means c, an image processing means d, and a control/power supply means e, configured from top to bottom in that order, and a film securing drum f, located next to the image processing means d. The various means in the variable density image (grey scale image) photographic apparatus i in FIG. 22 are thus stacked one on top of another, resulting in a height of approximately 1,200 mm and a weight of some 290 kg. Symbol p in FIG. 22 represents a pick-up mechanism, and g represents a film conveyor means which feeds and also retrieves the film.

FIG. 23 depicts a variable density image (grey scale image) photographic apparatus i, consisting of a film feeding cassette a, an exposure means c, a film shape adjustment space s, a film securing and conveying means h which both secures and conveys the film, and an image processing, control, and power supply means j, configured from top to bottom in that order, and with a separate automatic development apparatus placed next to the variable density image (grey scale image) photographic apparatus. The film which has been developed by this automatic developer is retrieved in the tray t, located on top of variable density image (grey scale image) photographic apparatus i. Thus FIG. 23's variable density image (grey scale image) photographic apparatus, like that shown in FIG. 22, has its components stacked one on top of another; moreover, there is a film shape adjustment space s located between exposure means and film-securer and conveyor means h, resulting in a height of approximately 900 mm and a weight of approximately 250 kg. In addition, the height of the automatic development apparatus is approximately 1250 mm; the total weight comes to roughly 500 kg. Symbol p in FIG. 23 represents a pick-up mechanism, and g represents a film conveyor means.

FIG. 24 depicts a variable density image (grey scale image) photographic apparatus i, consisting of a film feeding cassette a, a film-shape adjustment space s, and a film securing half-cylinder k, configured from top to bottom in that order, with an exposure means c located in the center of the half-cylinder k, and with an image processing, control, and power supply means m located adjacent to the film shape adjustment space s and film securing means k. An automatic development apparatus is mounted on top of variable density image (grey scale image) photographic apparatus i, so that the total height of variable density image (grey scale image) photographic apparatus i, including that of the automatic developer, comes to approximately 1,500 mm, and their combined weight comes to approximately 370 kg. Symbol p in FIG. 24 represents a pick-up mechanism, and g represents a film conveyor means.

FIG. 25 depicts a variable density image (grey scale image) photographic apparatus i, consisting of an exposure means c, a film securing drum f, a film retrieval cassette b, a film feeding cassette a, and an image processing, control, and power supply means m, configured from top to bottom in that order. For this reason, the height of variable density image (grey scale image) photographic apparatus i is approximately 1,030 mm, and its weight is approximately 180 kg. Symbol p in FIG. 25 represents a pick-up mechanism, and g represents a film conveyor means.

FIG. 26 represents a variable density image (grey scale image) photographic apparatus i, consisting of a film feeding cassette a, a film securing quarter-cylinder n with a revolving type exposure means c, and an image processing and power supply means o, configured from top to bottom in that order, with a control means q installed adjacent to the film securing quarter-cylinder n. As a result, this variable density image (grey scale image) photographic apparatus i measures roughly 1,280 mm in height, and its weight is approximately 170 kg. Symbol p in FIG. 26 represents a pick-up mechanism, and g represents a film conveyor means.

Thus, the conventional variable density image (grey scale image) photographic apparatuses i exceed 1 meter in height and weigh around 200 kg. Their large size gives rise to certain problems: they require a large space in which to be installed; efficient utilization of floor space and room space is reduced in the facilities in which they are installed; and shipping and moving of these apparatuses is a complex and expensive undertaking.

For these reasons, the advent of an easy-to-handle variable density image (grey scale image) photographic apparatus measuring less than 1 meter in height and weighing under 100 kg will be warmly welcomed by medical professionals who deal with medical equipment of this type.

In developing this invention, we have sought to learn from such problems with the prior art. The object of this invention is to offer a variable density image (grey scale image) processing method, and a variable density image processing apparatus utilizing it, which can render identifiable a single-sheet photosensitive medium on which multiple images have been made, by simply and rapidly inscribing identifying information in a designated location on the medium.

An additional object is to provide a variable density image (grey scale image) photographic apparatus which can make photographs out of images from variable density image processing apparatus and which is smaller and more lightweight, thus enhancing the efficient utilization of floor and room space in facilities in which it is installed, and improving ease of shipping and moving.

DISCLOSURE OF THE INVENTION

As a result of extensive research into these problems, the inventors have found that in as much as each image, as discussed above, contains data specifying its own identifying data, such as identification number, patient name, creation date, etc., the problems discussed above could be solved by a more flexible disposition of such data. That idea led to the development of this invention.

A variable density image (grey scale image) processing method of this invention is thus a variable density image (grey scale image) processing method intended as an image processing method for a single-sheet photosensitive medium on which multiple images are made. Its distinctive feature is that it includes a procedure for formulating digital images out of images input from an imaging means, a procedure for selecting a specific image from among these multiple images, a procedure for extracting from the graphic data of that selected image a certain specific zone of graphic data, a procedure for converting the specific zone of data thus extracted into digital data enlarged by a designated multiplier, and a procedure for outputting this converted image of the specific zone of graphic data to an optical processing system.

It is preferable that the variable density image (grey scale image) processing method of this invention is supplemented by a procedure for removing any non-character data (i.e. data other than letters, numbers, etc.) which may be included within the specified zone of graphic data.

Moreover, a variable density image (grey scale image) processing apparatus of this invention is a variable density image (grey scale image) processing apparatus which can be used to form multiple images on a single-sheet photosensitive medium. A distinctive feature is that it is equipped with an original image memory means, a Number 1 image processing means, a Number 2 image processing means, an image output means and input means, and an arithmetic processing means, where the identifying data processing means identify data specific to the multiple images are extracted therefrom;

enlarge the extracted identifying data by a designated multiplier; and the enlarged identifying data at a designated location on the photosensitive medium.

It is preferable that variable density image (grey scale image) processing apparatus of this invention is supplemented by a removal means for removing any non-character data which may be included in the identifying data.

The distinctive feature of variable density image (grey scale image) photographic apparatus of this invention is that it is equipped with a film feeding means, a film retrieval means, an image processing means, an exposure means, a control means, a power supply means, and a film conveyor means, and that the film feeding means and the film retrieval means are set at a fixed interval from one another, with the exposure means placed between them.

It is preferable for variable density image (grey scale image) photographic apparatus of this invention that the film is exposed by the exposure mechanism while being conveyed by the film conveyor means.

It is also preferable for variable density image (grey scale image) photographic apparatus of this invention that the conveyor means is equipped with a conveying mechanism having at least one pair of rollers, stretched over a soft and pliable belt, somewhat wider than the conveyed film, on the side of the film where its edges curl.

In addition, for the variable density image (grey scale image) photographic apparatus of this invention, this belt is preferably set in the target location of the exposure means.

Because the variable density image (grey scale image) processing method of this invention includes all of the procedures described above, it is able to extract from among the images formed on a photosensitive medium the data which typifies that medium, e.g. identification number, patient name, image creation date, etc.; to enlarge that data to a size which can be read by the unaided eye; and to instruct the optical processing system which exposes the medium to inscribe that data onto the medium at a designated location, such as the bottom part of the medium.

Since data other than written characters may be included in the information thus extracted, the variable density image (grey scale image) processing method of this invention can, in its preferable aspect, be instructed to remove such non-character data, so that only character information is inscribed onto the designated location on the photosensitive medium.

The variable density image (grey scale image) processing apparatus of this invention is configured as described above, and is therefore able to extract from among the images formed on the photosensitive medium the data which typifies that medium, such as identification number, patient name, image creation date, etc.; to enlarge that data to a size readable by the unaided eye; and to then output that data to an optical processing system as instruction data to be inscribed onto the photosensitive medium at a designated location, for instance at the bottom of the medium.

The data thus extracted may include non-character information; however, in a preferable aspect of variable density image (grey scale image) processing apparatus of this invention is able to remove such information, outputting only character information to the optical processing system as instruction data to be inscribed onto a designated location on the photosensitive medium.

The variable density image (grey scale image) photographic apparatus of this invention is configured as described above, resulting in reduction in both size and weight for the apparatus as a whole.

It is preferable in this apparatus that the exposure of film takes place in the space between the film feeding cassette and the film retrieval cassette.

In a preferable aspect of variable density image (grey scale image) photographic apparatus of this invention, exposure of the film takes place while the film is being conveyed; hence there is no need to stop the film to allow it to be exposed, and processing time is shortened.

In another preferable aspect of variable density image (grey scale image) photographic apparatus of this invention, a belt is used to prevent curling of the edges of film, allowing the images to be inscribed onto stabilized film.

BRIEF DESCRIPTIONS OF THE DRAWINGS

FIG. 1 is a block diagram of an image processing apparatus used in image processing method of this invention.

FIG. 2 is a block diagram of an original image memory processing means.

FIG. 3 is a block diagram of a Number 1 image processing means.

FIG. 8 is an explanatory illustration of film with data inscribed onto it by variable density image (grey scale image) processing method of this invention.

FIG. 21 is an explanatory illustration of images inscribed on film by a conventional image processing methods.

BEST MODE FOR CARRYING OUT THE INVENTION

Figure 4:
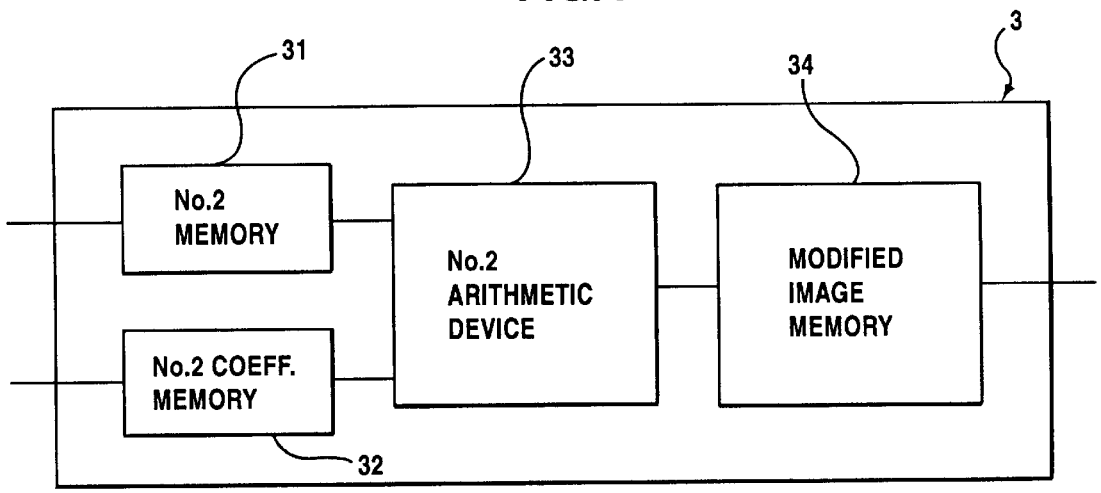
FIG. 4 is a block diagram of a Number 2 image processing means.

Now, referring to the drawings attached hereto, this invention is disclosed below on the basis of an embodiment, however, the scope of this invention is not only limited to the embodiment.

FIG. 1 shows a block diagram of the variable density image (grey scale image) processing apparatus to be used for the variable density image (grey scale image) processing method of this invention.

The variable density image processing apparatus comprises an original image memory means 1, a Number 1 image processing means 2, a Number 2 image processing means 3, an image output means 4, an identifying data processing means 5, an input means 6, and an arithmetic processing means 7 as its main constituents.

The original image memory means 1 has a function to temporarily store the image to be input from an X-ray CT unit or an MRI unit. Accordingly, the original image memory means 1 comprises an A/D converter 11 and an input-side line memory 12 as its main constituents (cf. FIG. 2). An original image stored in the original image memory means 1 is input into the Number 1 image processing means 2 through the signal line, and the original image for extraction of the identifying data is input into the identifying data processing means 5 through the signal line.

The detailed explanation of the configuration of the A/D converter 11 and the input-side line memory 12 is omitted, however, it is suitable to use the devices which are conventionally used for this sort of image processing apparatus.

The Number 1 image processing means 2 has a function to set the density of the newly generated grid point strings (or, lines) for the image modified by a real multiplier, using the density of the strings (or, lines) of the original image's graphic elements which are input from the original image memory means 1. For this, the Number 1 image processing means 2 comprises a Number 1 memory 21 which stores the data of original image elements, a Number 1 coefficient memory 22 which stores weighted table or function, and a Number 1 arithmetic device 23 which computes density of grid point strings newly generated by the data of original image elements and coefficient which is obtained from the weighted table or function, as its main constituents (cf. FIG. 3). The graphic data generated by the Number 1 image processing means 2 is input into the Number 2 image processing means 3 through the signal lines.

The Number 2 image processing means 3 has a function to set the density of the grid point lines (or, strings) newly generated by the graphic data of the grid point strings (or, lines) with the density set by the Number 1 image processing means 2. For this, the Number 2 image processing means 3 comprises a Number 2 memory 31 which stores the graphic data of the grid point strings (or, lines) with the set density, a Number 2 coefficient memory 32 which stores weighted table or function, a Number 2 arithmetic device 33 which computes density of the grid point lines (or, strings) without density to be set by the coefficient obtained from the graphic data of the grid point strings (or, lines) with a set density and weighted table or function, and the modified image memory 34 which stores the modified image with a set density, as its main constituents (cf. FIG. 4). The data generated by the Number 2 image processing means 3 is input into the image output means 4 through the signal lines.

Multiplication by a real multiplier herein means to modify by an arbitrary real multiplier such as by 0.1 . . . 1.5 . . . 2.0 . . . 3.6 . . . 4.0 . . . 4.8 . . . Accordingly, it implies not only enlargement but also reduction.

The image output means 4 has a function to form a latent image on photo film by adjusting the modified image which is input from the Number 2 image processing means 3 at a designated density and by consecutively outputting each line in a form of analogue signal to the optical processing system (optical processing apparatus). In other words, it has a function to instruct to inscribe an image on film. For this, the image output means 4 comprises a density adjustor 41 and a D/A converter 42 as its main constituents. When the latent image is formed (inscribed) on photo film, it includes all graphic data which is stored in the modified image memory 34 of the Number 2 image processing means 3.

Figure 5:
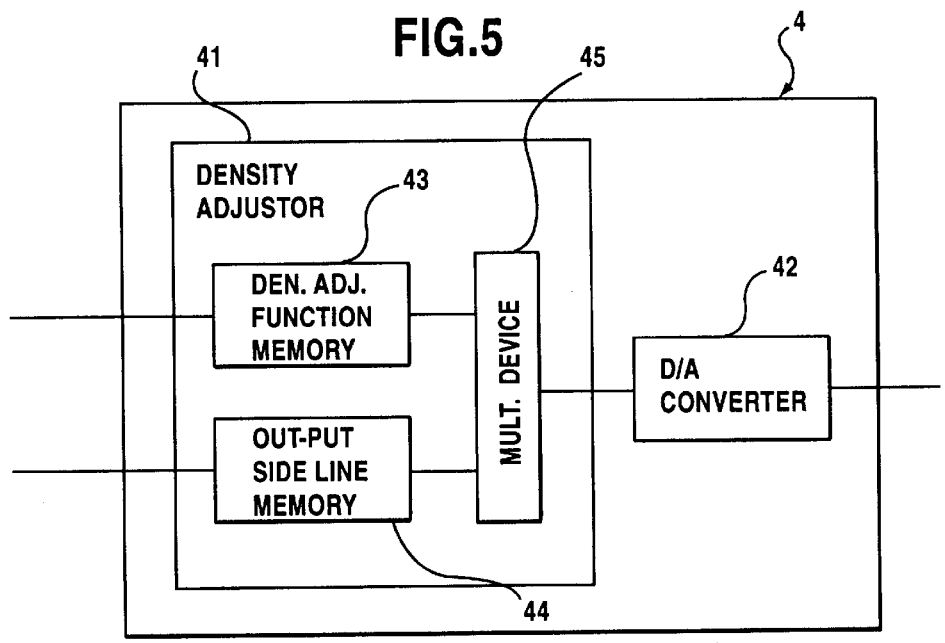
FIG. 5 is a block diagram of an image output means.

The density adjustor (LUT—Look up table) 41 has a function to multiply the gamma characteristic of photo film and the graphic data which is modified by a designated multiplier and given a set density in order to make it easy to be seen, i.e., the graphic data stored in the modified image memory 34 of the Number 2 image processing means 3, by a coefficient in the range between 0 to 1.0 (density adjustment value) computed by a designated density adjustment function. For this, the density adjustor 41 has the density adjusting function memory 43 which rewrites a density adjustment function whenever necessary, an output-side line memory 44 which stores the computed graphic data stored in the modified image memory 34 of the Number 2 image processing means 3 in a portion of one line, and the multiplying device 45 which multiplies the graphic data by a density adjustment value (cf. FIG. 5).

The detailed explanation of the configuration of the D/A converter 42, the output-side line memory 44 and the multiplying device 45 is omitted here, however, it is suitable to use the devices which are conventionally used for this sort of image processing apparatus.

Figure 6:
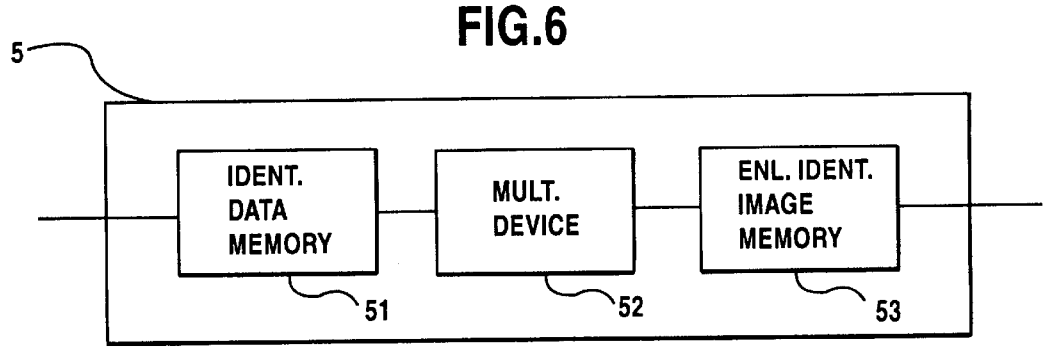
FIG. 6 is a block diagram of identifying data processing means.

The identifying data processing means 5 has a function to extract identifying data from the image which is input from the original image memory means 1, to enlarge the extracted identifying data by a designated multiplier, and to instruct the image output means 4 to inscribe such enlarged identifying data on a designated location of photosensitive medium. For this, the identifying data processing means 5 comprises an identifying data memory 51 for storage of the extracted identifying data, an arithmetic device 52 which enlarges identifying data by a designated multiplier, and an enlarged identifying image memory 53 for storage of the image relating to the enlarged identifying data, i.e., the data relating to the enlarged identifying image, as its main constituents (cf. FIG. 6).

Following is the explanation of extraction of the identifying data by reference to FIG. 8.

In this case, since multiple images to be inscribed on a single-sheet of photo film are of the same person, identifying data can be extracted from any one of the images. However, for the sake of convenience in data processing, it is usually extracted from the first image to be first inscribed on (in the case of FIG. 8, from the image top left-hand corner). Also positioning of the identifying data of the image is unconditionally determined when a format of the image is determined. Format is specific to the type of machine and the hospital to which the machine belongs. Accordingly, identifying data can be extracted by preliminary instructing to extract data in a certain scope (data from a certain lot number to another certain lot number) of the original image memory means 1 which stores data relating to the first image, for example.

The input means 6 has the function to designate an image from which identifying data is extracted, a processing method, and a multiplier. The input device 6 with this function can be constituted of, for instance, a CRT display and a keyboard.

The arithmetic processing means 7 has a function to control input and output of the above mentioned means 1, 2, 3, 4, 5, and 6, to modify the original image by a certain multiplier (a real multiplier) through the image processing method instructed by the input means 6, and to compute a clearance between the newly generated grid points and the original image elements and a clearance between the grid points with unassigned density and those with assigned density. Therefore, the arithmetic processing means 7 comprises of a central processing unit (CPU) 71, a RAM, a ROM, and a CLOCK as its main constituents.

For the arithmetic processing device 71, a device which can promptly process a large volume of information should be used. To be more specific, it can be a parallel processing type computer (a computer which can be connected in a parallel line), a vector processing type computer, a co-processor which processes a specifically designated job, a DSP (digital signal processor) which directly processes digital values into signals, or a data-flow type computer.

The RAM 72 temporarily stores information necessary to the arithmetic processing. It is suitable to use a RAM which is conventionally used for image processing apparatus.

The ROM 73 stores the program to compute a clearance between the newly generated grid points without an assigned density and the original image elements, or a clearance between the grid points with a set density and the original image elements, the program to extract identifying data from the graphic data of the original image memory means 1, the program to remove data other than characters if they are included in the identifying data, and the program necessary for controlling operation of the above mentioned means 1, 2, 3, 4, 5, and 6. For the ROM 73, it is suitable to use the one which is conventionally used for image processing apparatus.

Removal of data other than written characters can be done by altering intermediate values except for 1 to 0, since characters are binary.

The CLOCK 74 synchronizes flow of every information, and any device conventionally used for this sort of arithmetic processing device suits the CLOCK 74.

Program counter and other necessary elements for arithmetic processing are equipped in this image processing apparatus, although it is not illustrated in the drawing.

Figure 7:
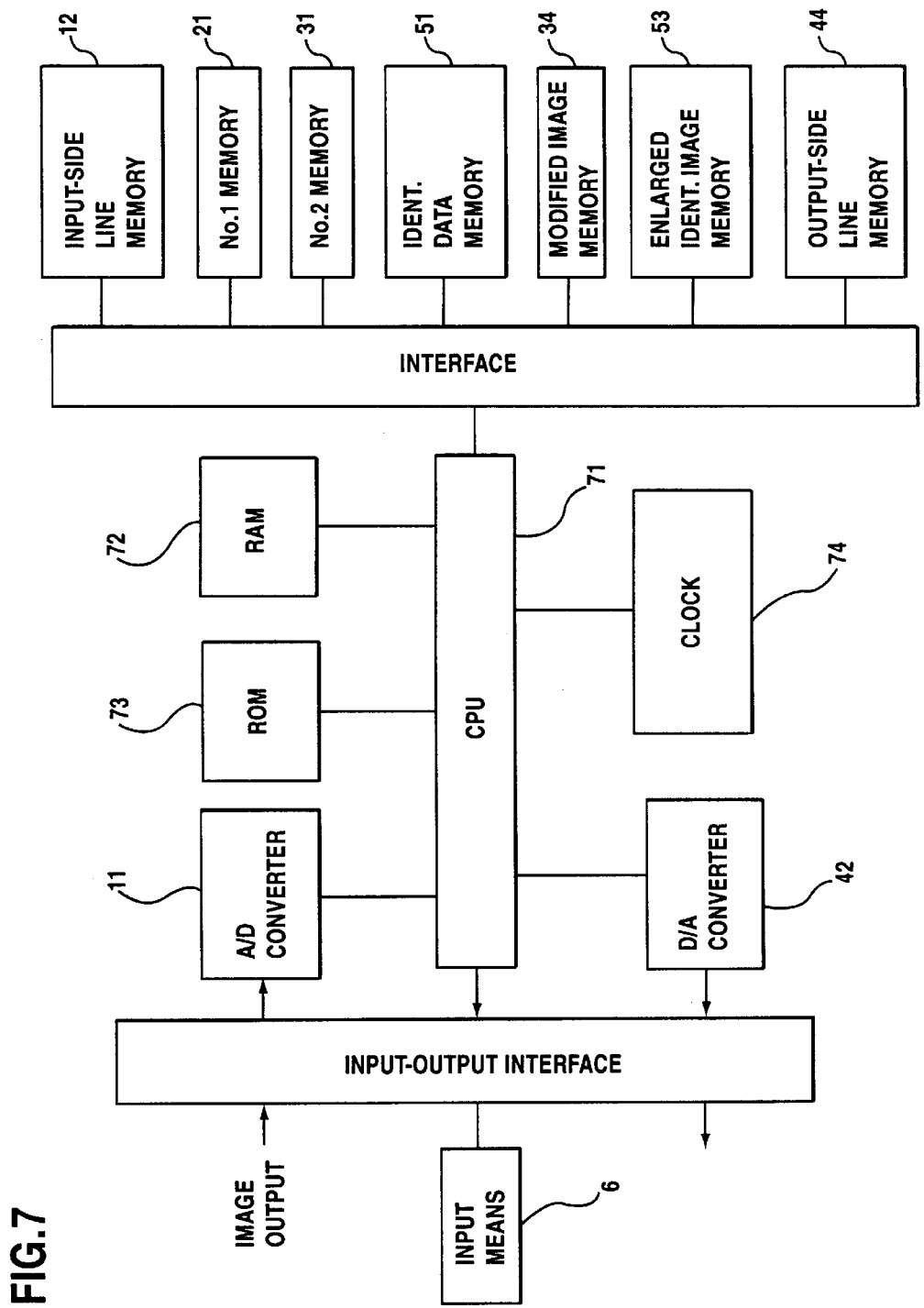
FIG. 7 is a schematic illustration of one embodiment of image processing apparatus shown in FIG. 1 in a software configuration.

FIG. 7 depicts a schematic illustration of one embodiment in a software configuration of the variable density image (grey scale image) processing apparatus as described above.

Following are the steps of image processing with this embodiment of the variable density image (grey scale image) processing apparatus in the configuration as mentioned above.

Step 1: Input an X-ray CT image or an MRI image of analog image into the original image memory means 1.

Step 2: The original image memory means 1 converts the input analog image to a digital image through the A/D converter 11.

Step 3: Store the data of the image elements of the digital image in the input-side line memory 12 of the original image memory means 1.

Step 4: Store the data of the original image elements stored in the original image memory means 1 in the Number 1 memory 21 of the Number 1 image processing means 2 in a designated arrangement.

Step 5: An image processing method and a multiplier to be used are instructed from the input means 6.

Step 6: Modify the clearance among the original image elements by a designated multiplier, and at the same time, generate new grid points in the modified clearances of the original image elements at a fixed clearance.

Step 7: Compute density for the newly generated grid points through the designated processing method. Steps of this process are explained later.

Step 8: Store the modified image of the newly generated grid points with the set density stored in the modified image memory 34 of the Number 2 image processing means 3.

Step 9: Consecutively call the modified graphic data from the modified image memory 34 of the Number 2 image processing means 3, and store it in the output-side line memory 44 of the image output means 4.

Step 10: Consecutively output the data of the output-side line memory 44, adjust its density by the density adjustor 41, output it to the D/A convertor 42 and convert into an analog image.

Step 11: Output the analog image to an optical processing apparatus (a laser scanning apparatus).

Step 12: From the input means 6, instruct the original image memory means 1 as to from which image identifying data is to be extracted, and at the same time instruct the identifying data processing means 5 as to which processing method and multiplier are to be used. However, as mentioned above, identifying data is usually extracted from the first image.

Step 13: Input the designated image into the identifying data processing means 5 from the original image memory means 1.

Step 14: The identifying data processing means 5 extracts identifying data from the input image, and stores it into the identifying data memory 51. In case that this extracted data includes data other than written characters, the identifying data processing means 5 removes those non-character data.

Step 15: Enlarge the clearance among the image elements of the identifying data by a designated multiplier, and generate new grid points in the enlarged clearances at a designated clearance.

Step 16: Compute density of the newly generated grid points through the designated processing method. This processing method is the same as that of Step 7.

Step 17: Store the enlarged image consisting of the newly generated grid points with the set density in the enlarged image memory 53.

Step 18: Consecutively call the enlarged identifying graphic data from the enlarged identifying image memory 53, and store it in the output-side line memory 44 of the image output means 4.

Step 19: Consecutively output the data of the output-side line memory 44, adjust its density with the density adjustor 41,output it to the D/A converter 42, and convert it into an analog image.

Step 20: Output the analog image to the optical processing apparatus (the laser scanning apparatus).

After Step 20, the image relating to the identifying data which is output to the optical processing apparatus is inscribed on, for instance, an empty space at the bottom of film (cf. FIG. 8). Steps 9, 10 and 11 are repeated until the graphic data stored in the modified image memory 34 is all output.

Figure 9:
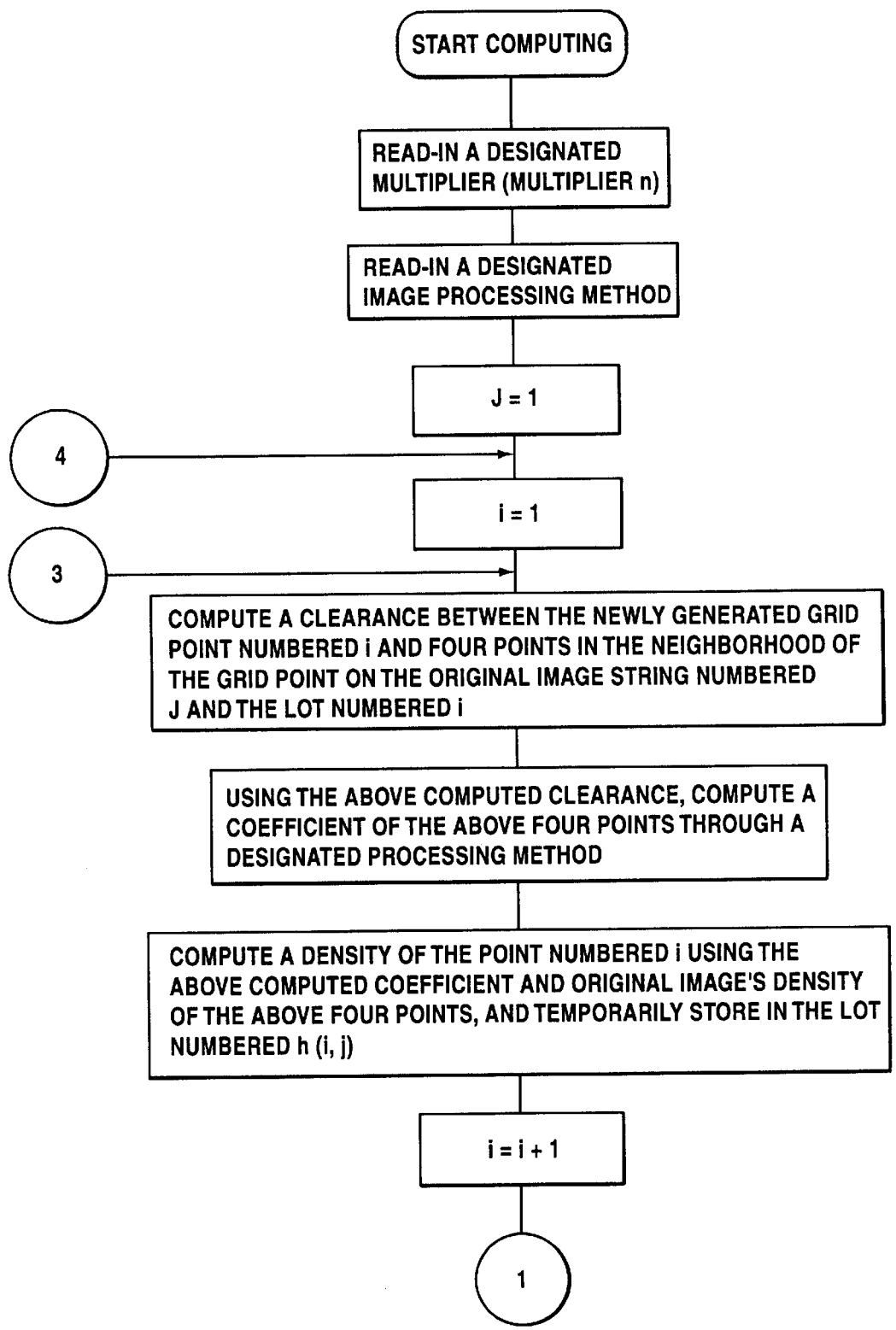
FIG. 9 is a part of a flowchart showing one example of the image processing procedure used in variable density image (grey scale image) processing method of this invention.
Figure 10:
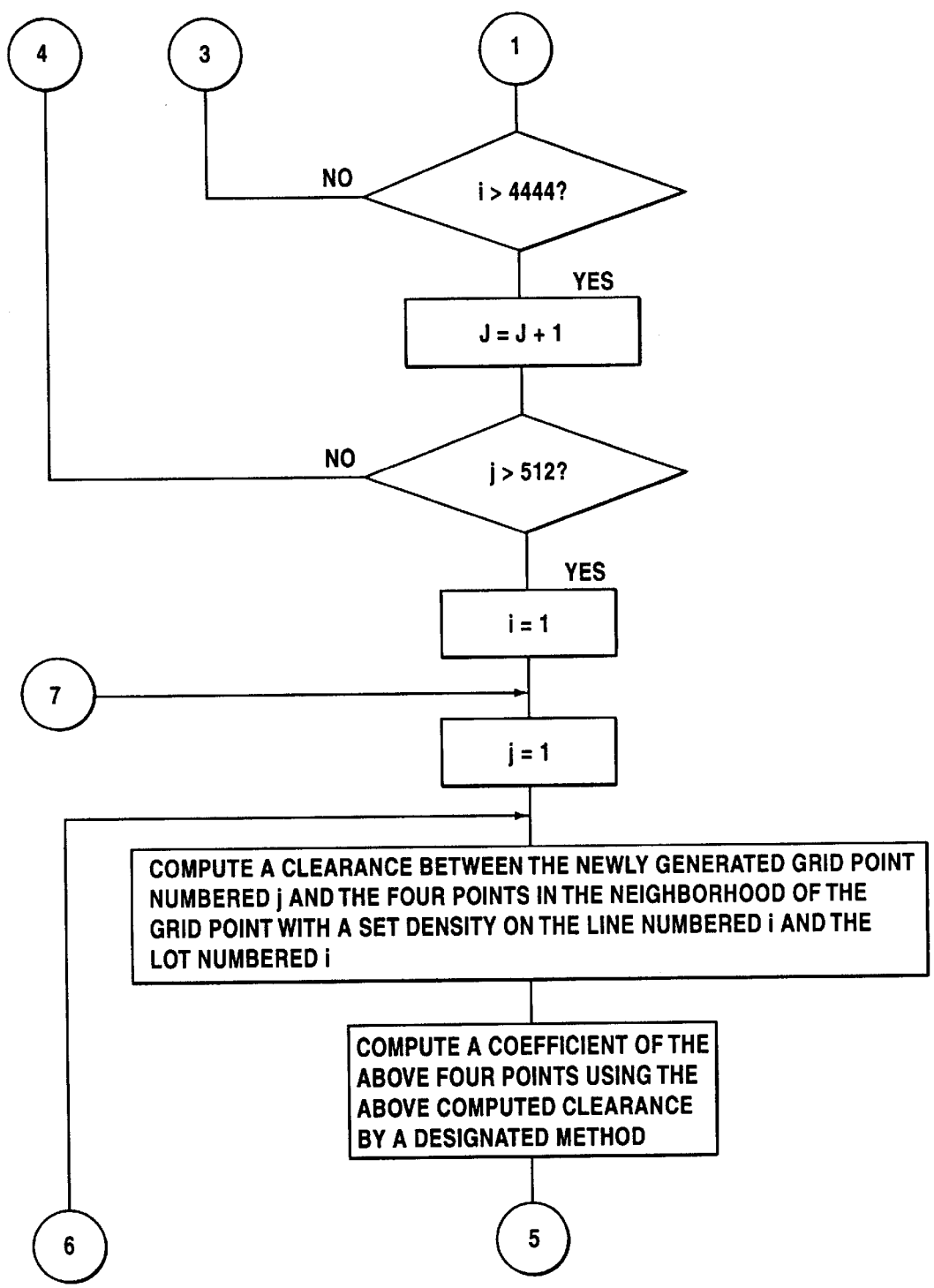
FIG. 10 is a part of a flowchart showing one example of the image processing procedure used in variable density image (grey scale image) processing method of this invention; it is a continuation of the flowchart shown in FIG. 9.
Figure 11:
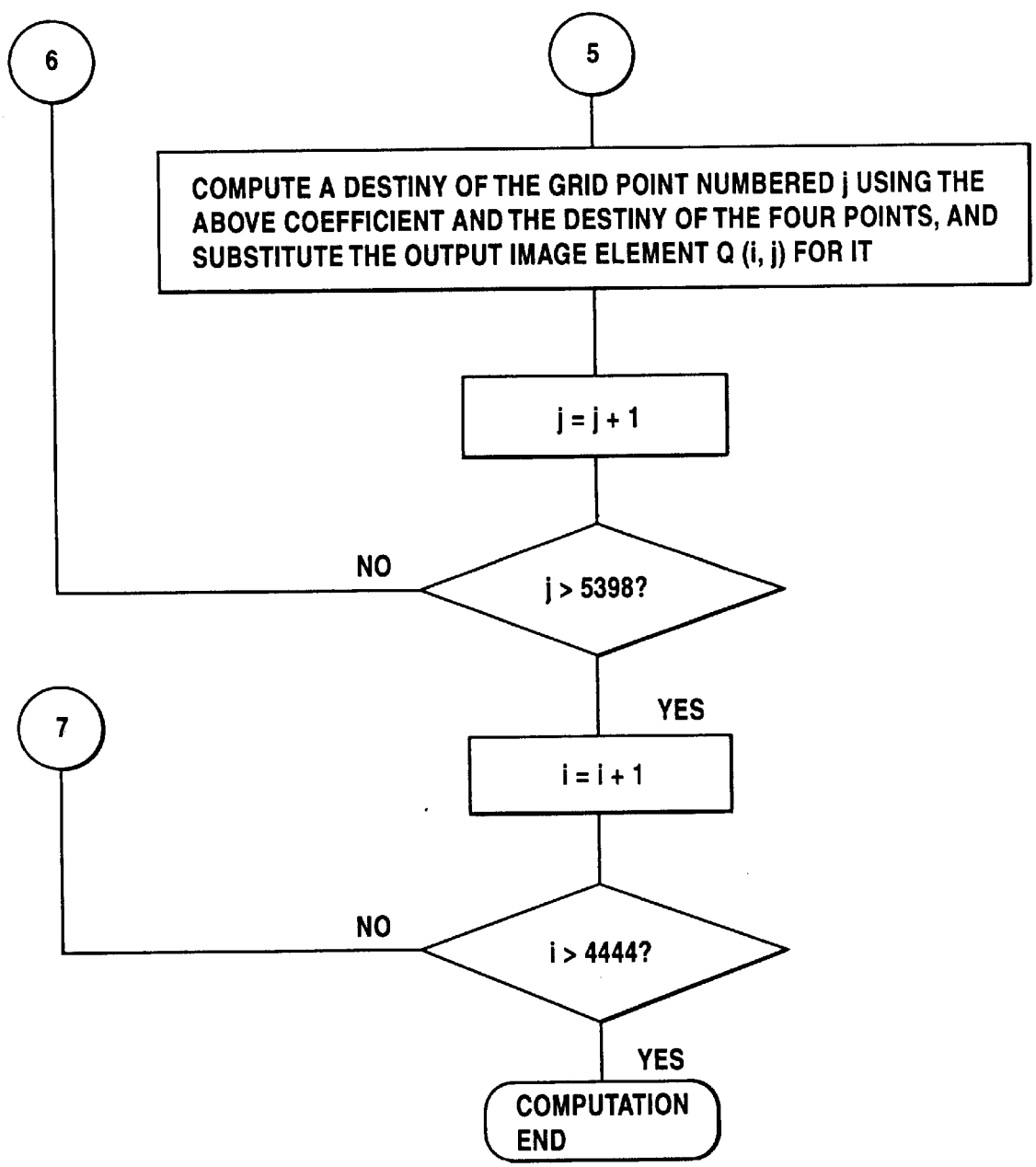
FIG. 11 is a part of a flowchart showing one example of the image processing means used in variable density image (grey scale image) processing method of this invention; it is a continuation of the flowchart shown in FIG. 10.

Following is an example of the image processing procedure used for this embodiment. It is explained according to the flowcharts of FIGS. 9, 10 and 11.

Step 31: Read a designated multiplier.
Step 32: Read a designated image processing method.
Step 33: Set the J at 1. Here, the J represents the string number of the original image elements.
Step 34: Set the i at 1. Here, the i represents the line number of the newly generated grid points.
Step 35: Compute the clearance between the grid point numbered i and the four grid points in the nearest neighborhood of the grid point numbered i on the string numbered J.
Step 36: Using a weighted table or a function, compute the coefficient of the above four points using the above computed clearance through the designated processing method. For this weighted table or function, the nearest neighborhood method, the linear interpolation method, or the spline interpolation method is used, for example.
Step 37: With the above coefficient and the density of the four original image elements, compute the density of the grid point numbered i, and store it temporarily at the lot number h (i, J).

Step 38: Add 1 to the i.

Step 39: Judge if the i exceeds 4444. If the i does not exceed 4444, return to the Step 35. If the i exceeds 4444, proceed to the next step. Here, 4444 indicates the last line number of the newly generated grid points. In this embodiment, the last line is numbered at 4444, however, it can be appropriately set at any other number.

Step 40: Add 1 to the J.

Step 41: Judge if the J exceeds 512. If the J does not exceed 512, return to the Step 34. If the J exceeds 512, proceed to the next step. Here, 512 indicates the last string number of the original image element strings. In this embodiment, the last string is numbered at 512, however, it can be set at any number according to the number of the original image element strings.

Step 42: Set the i at 1.

Step 43: Set the j at 1. Here, the j indicates the string number of the newly generated grid points.

Step 44: Compute the clearance between the grid point numbered j of the newly generated grid points and four nearest points to the above grid point numbered j on the line numbered i which density is set through the above mentioned process.

Step 45: Using a weighted table or a function, compute the coefficient of the above four points from the above computed clearance through the designated processing method. For this weighted table or function, the nearest neighborhood method, the linear interpolation method, or the spline interpolation method is used, for instance. The method used for this step should be the same method as used for Step 36.

Step 46: With the above coefficient and the density of the above four grid points, compute the density of the grid point numbered j, and substitute the outputting image element Q (i, j) for the density value.

Step 47: Add 1 to the j.

Step 48: Judge if the j exceeds 5398. If the j does not exceeds 5398, return to the Step 44. If the j exceeds 5398, proceed to the next step. Here, 5398 indicates the last string number of the newly generated grid points. In this embodiment, the last string is numbered at 5398, however, it can be set at any other number.

Step 49: Add 1 to the i.

Step 50: Judge if the i exceeds 4444. If the i does not exceed 4444, return to the Step 43. If the i exceeds 4444, finish computing.

Figure 12:
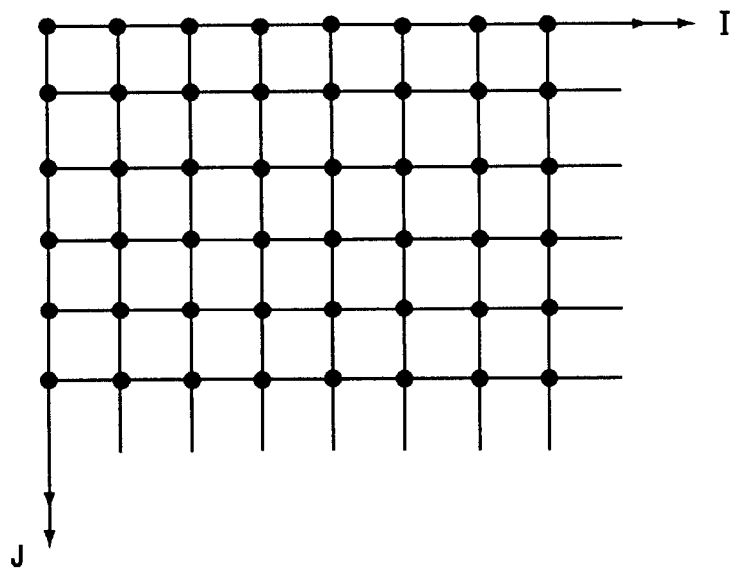
FIG. 12 is an image illustration of image processing in image processing method of this invention, showing the image prior to alteration.
Figure 13:
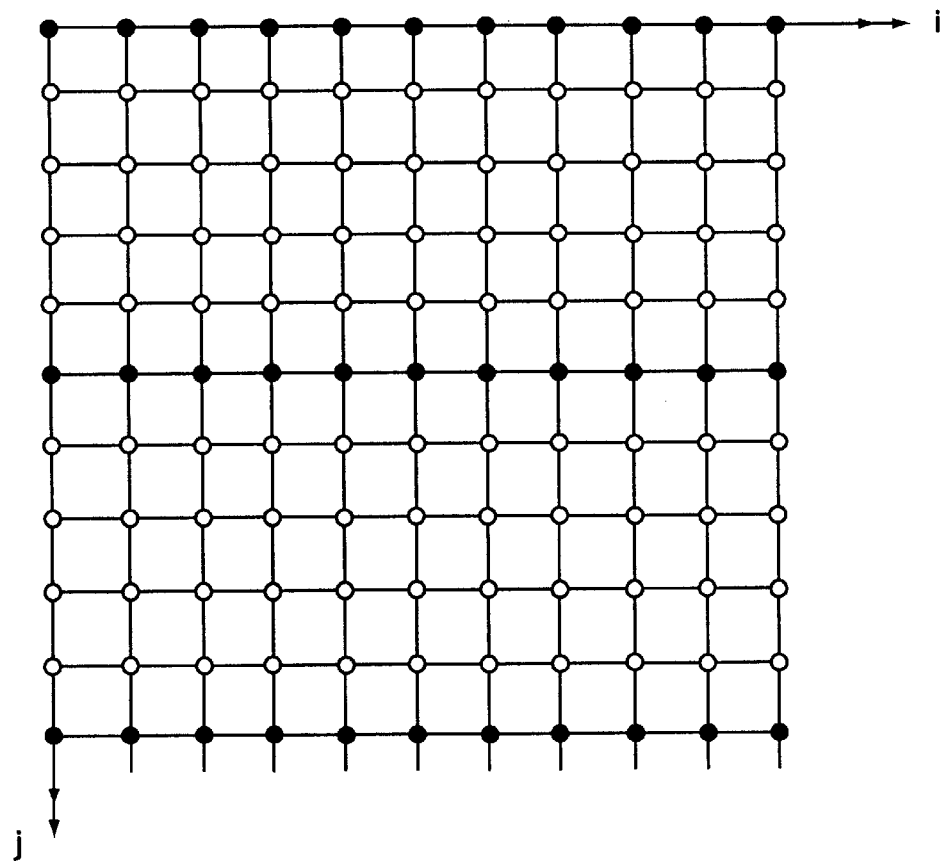
FIG. 13 is an image illustration of image processing in image processing method of this invention, showing the image after setting horizontal grid point density.
Figure 14:
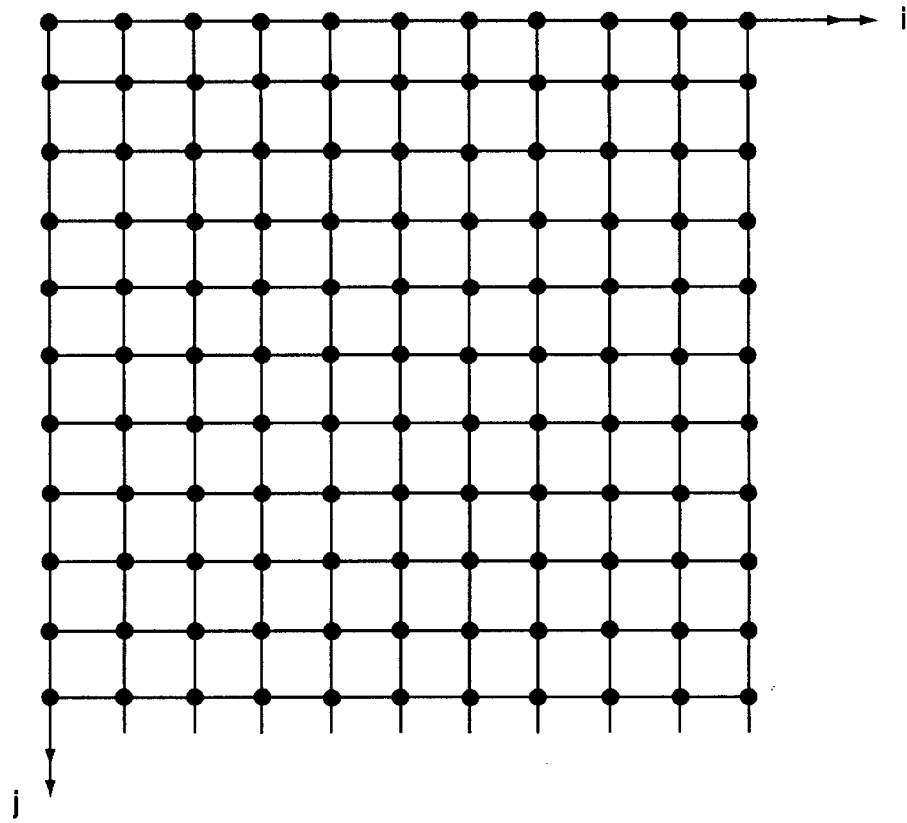
FIG. 14 is an image illustration of image processing in image processing method of this invention, showing the final image after setting vertical grid point density as well.

The above processed image is illustrated in FIGS. 12, 13 and 14. FIG. 12 shows the graphic image before modification. FIG. 13 shows the graphic image with the density set only horizontally. FIG. 14 shows the final graphic image with the density set both in horizontally and vertically. In FIGS. 12, 13 and 14, the blackened circle ● indicates a grid point (or image element) with a set density, and the blank circle ○ indicates a grid point with an unassigned density.

Figure 15:
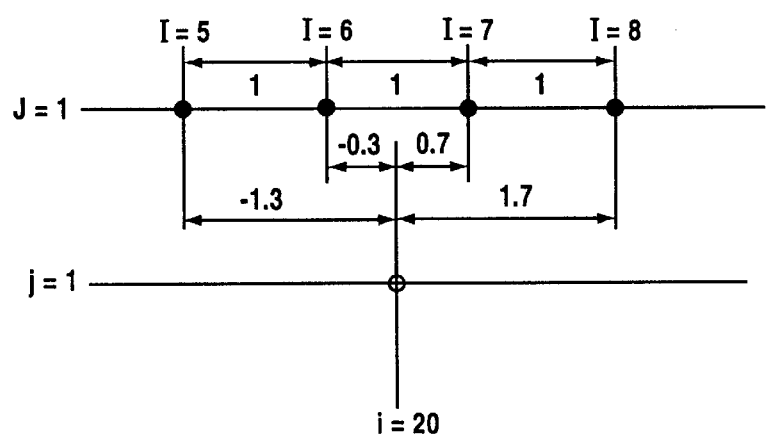
FIG. 15 is an explanatory illustration of the density arithmetic method for newly generated grid points.

Following is the density computing method for the newly generated grid points in reference to FIG. 15. It is computed according to the nearest neighborhood method, as an example.

In FIG. 15, the lines 5, 6, 7 and 8 of the first string of the original image elements are shown, and the point on the 20th line of the first string is shown as the grid point which needs density setting.

This grid point which needs density setting is away from the image elements (5, 1), (6, 1), (7, 1) and (8, 1) of the first string by a clearance of −1.3, −0.3, +0.7, and +1.7 relatively.

Figure 16:
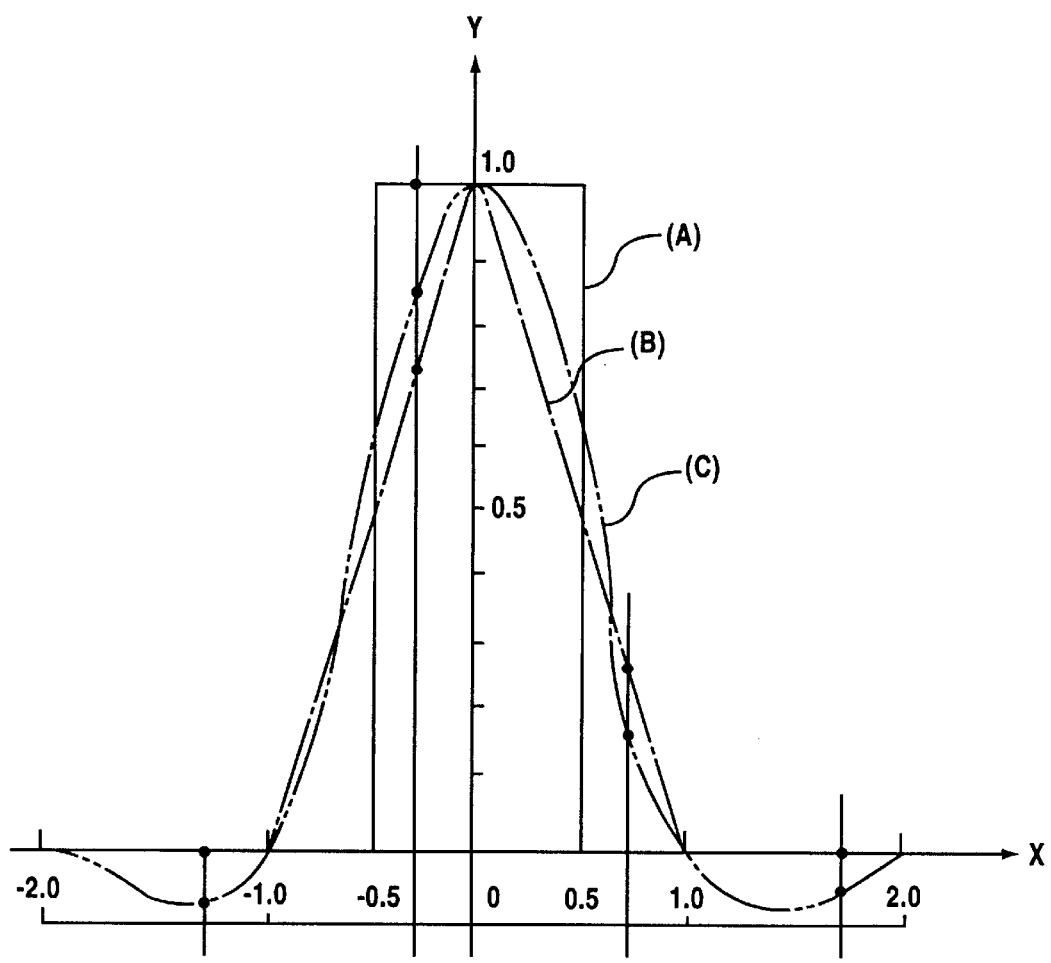
FIG. 16 is a weighted function graph.

The coefficients for these clearances are 0, 1, 0 and 0 as shown in the graph (A) of FIG. 16. The graphs (B) and (C) show the coefficients computed through the linear interpolation method and the spline interpolation method relatively.

Density of the newly generated grid points is calculated using the formula shown below.

$$h(i,j) = t_0 x_0 + t_1 x_1 + t_2 x_2 + t_3 x_3$$

t: Coefficient corresponding to clearance
x: Density of original image elements
subscript 0, 1, 2, 3: Numbers of the original image elements for the newly generated grid points Now, substitution of the above computed coefficients and the density of the original image elements for the above formula becomes as shown below:

$$h(20,1) = 0 \cdot x_0 + 1 \cdot x_1 + 0 \cdot x_2 + 0 \cdot x_3$$

Accordingly, in the above formula the only second term of the right member remains, and the density of the grid points is set at the density of the original image element in the nearest neighborhood. In other words, the density is set using the nearest neighborhood method.

Here, the density setting using the nearest neighborhood method is only explained. However, by changing a weighted table or function to be selected, the density for the newly generated grid points can be set through the linear interpolation method or the spline interpolation method in the same manner.

Following is an explanation of one embodiment of the variable density image photographic apparatus which mounts the above mentioned variable density image (grey scale image) processing apparatus, referring to the attached drawings.

Figure 17:
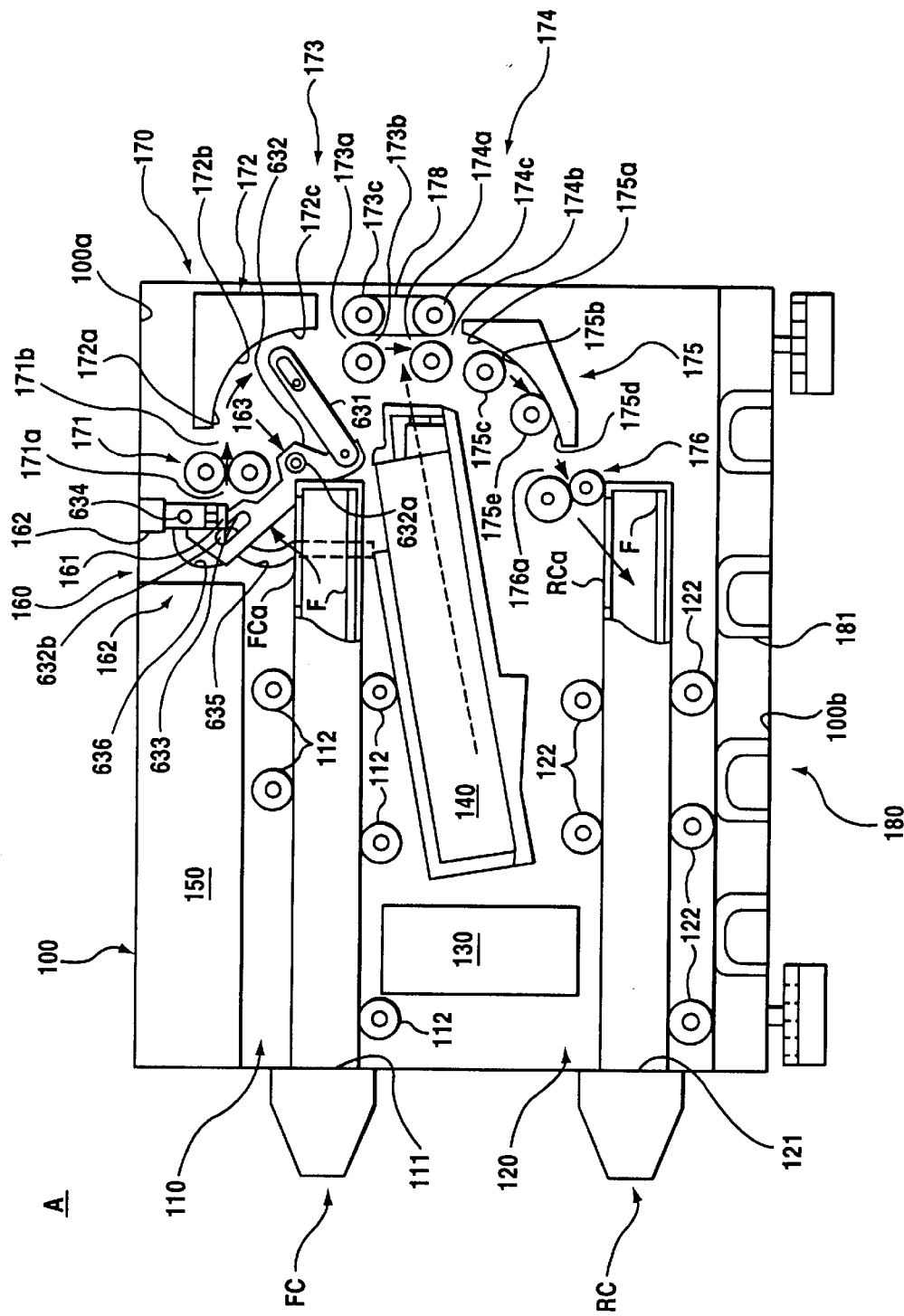
FIG. 17 is a cross-sectional view of one embodiment of variable density image photographic apparatus of this invention.
Figure 18:
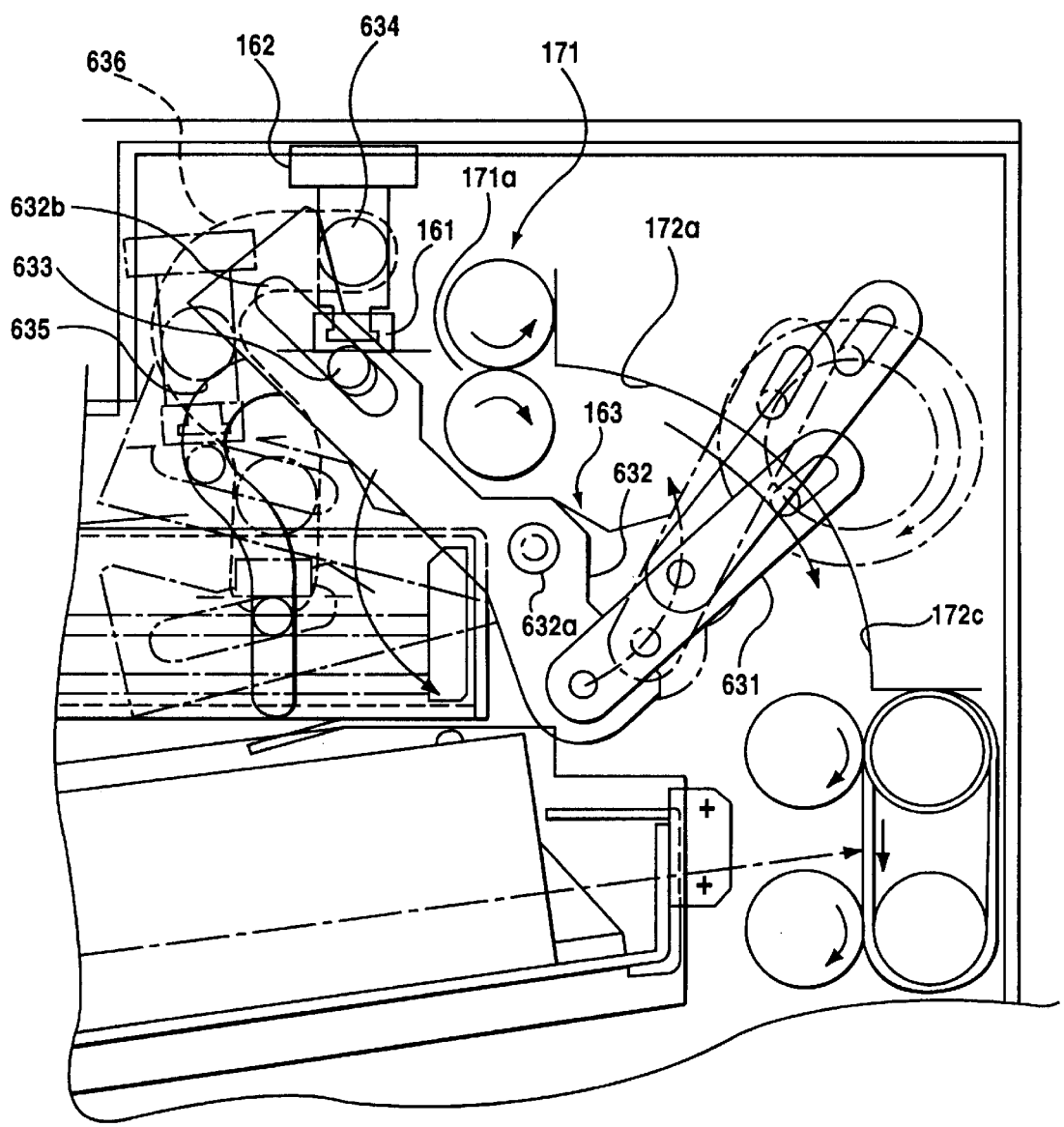
FIG. 18 is a cross-sectional illustration of a main part of the same embodiment.
Figure 19:
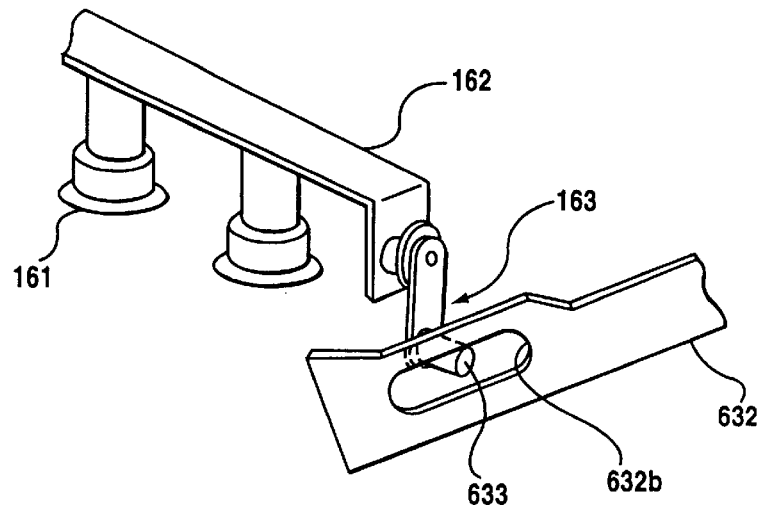
FIG. 19 is an explanatory illustration of a pick-up mechanism of the same embodiment.
Figure 20:
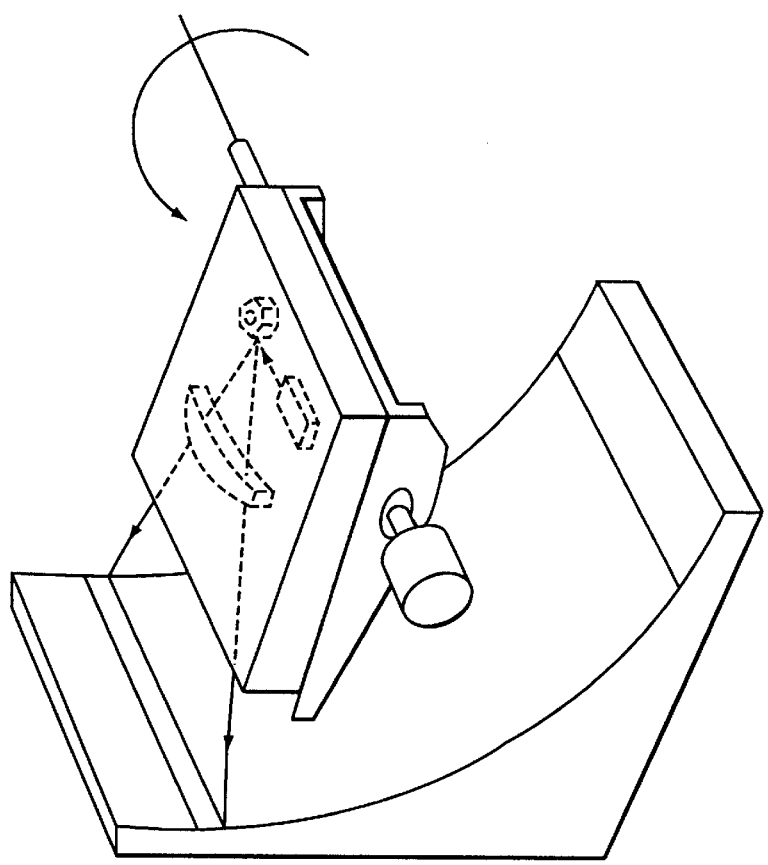
FIG. 20 is a schematic illustration of one example of an exposure apparatus.
Figure 22:
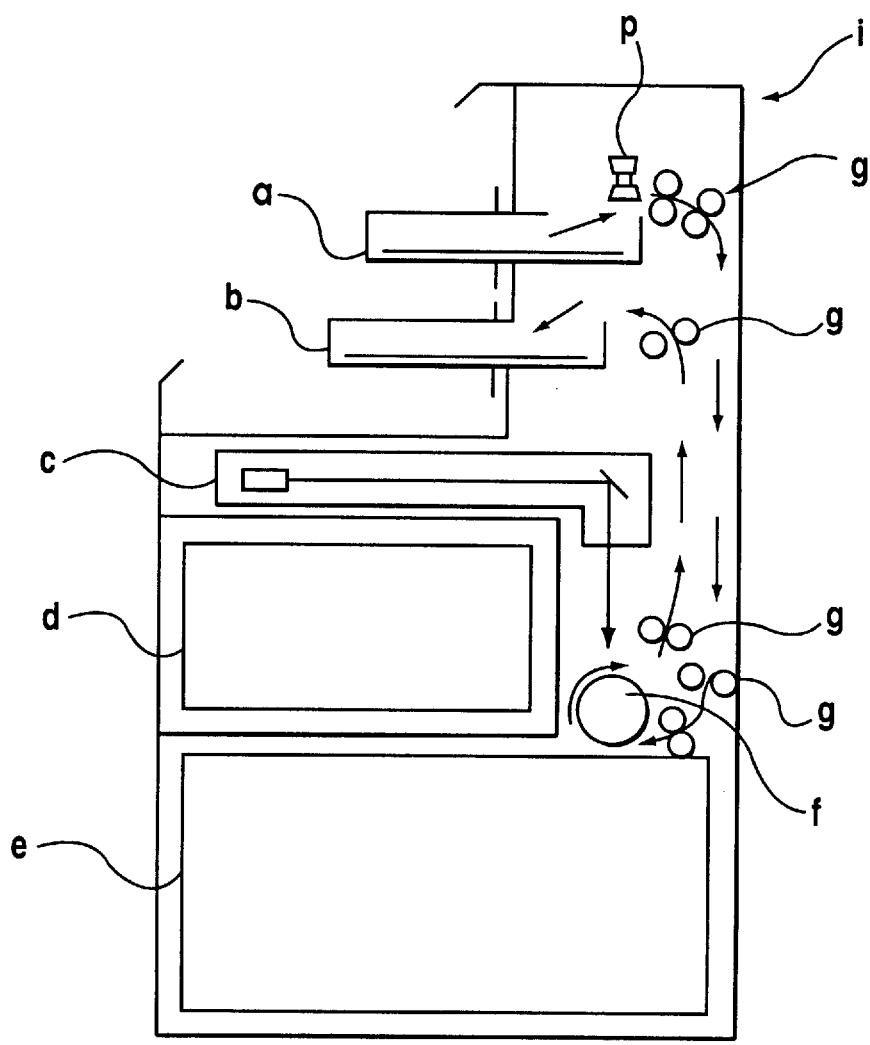
FIG. 22 is a schematic cross-sectional view of Example No. 1 of a conventional variable density image (grey scale image) photographic apparatus.
Figure 23:
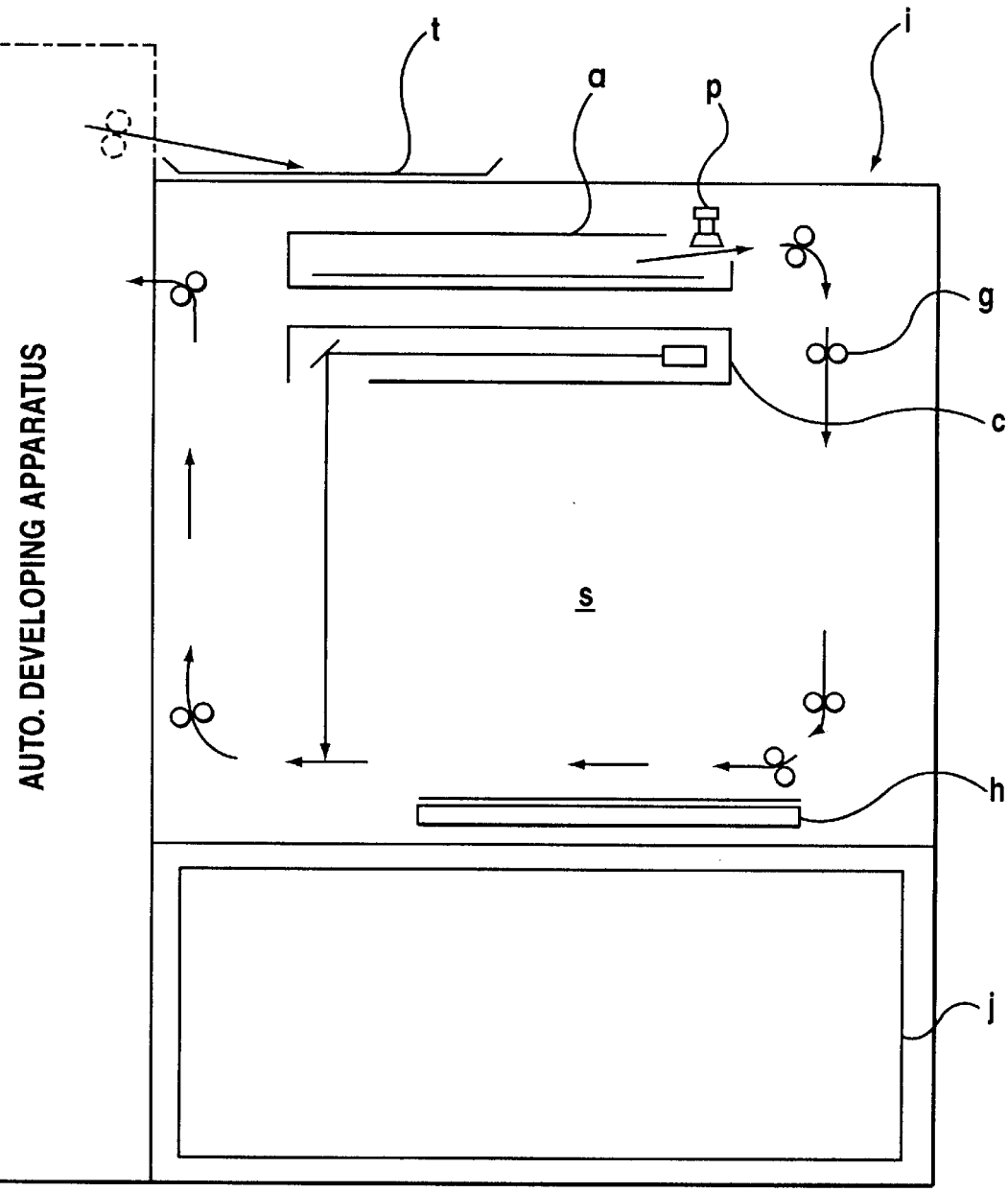
FIG. 23 is a schematic cross-sectional view of Example No. 2 of a conventional variable density image (grey scale image) photographic apparatus.
Figure 24:
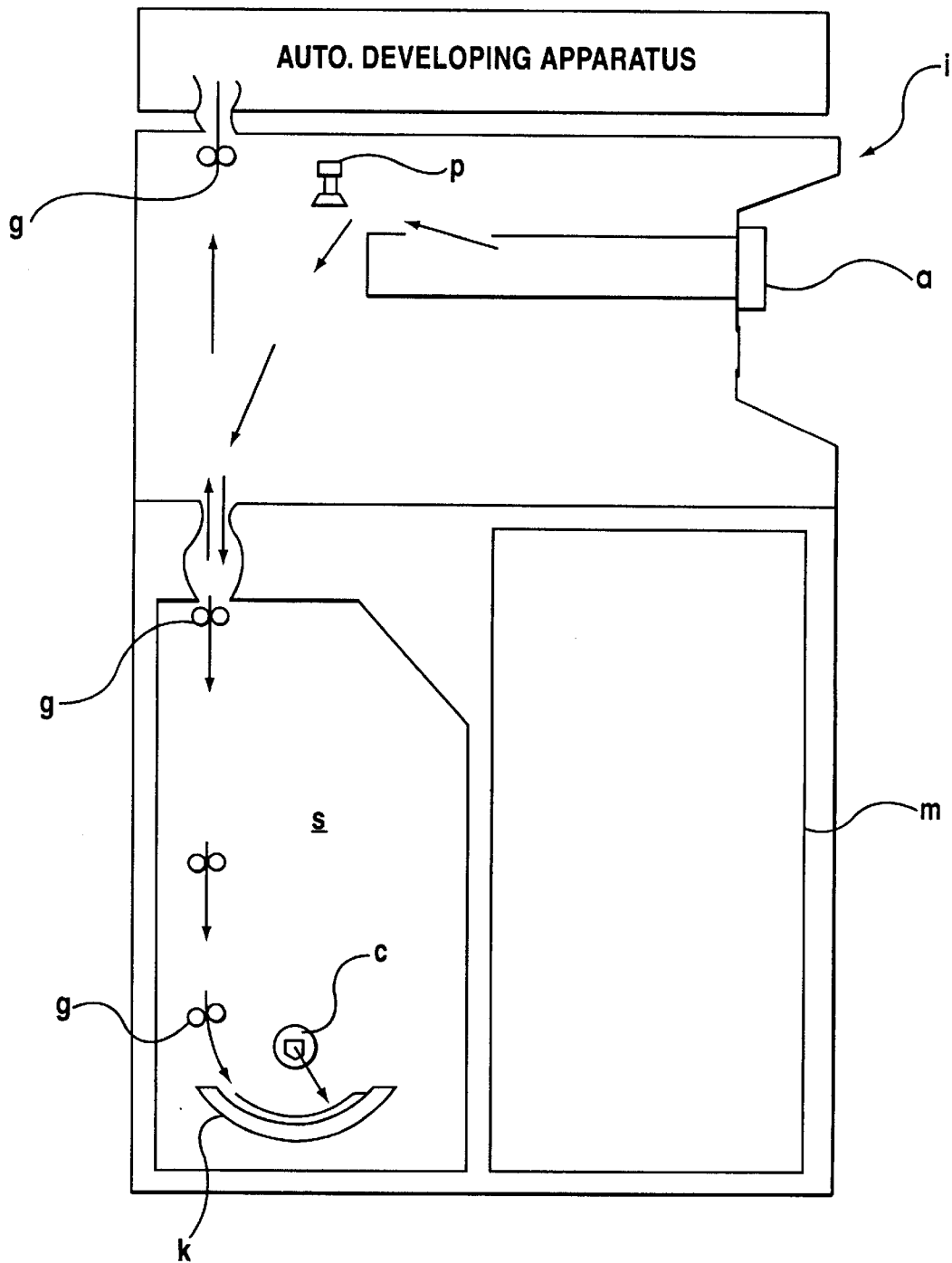
FIG. 24 is a schematic cross-sectional view of Example No. 3 of a conventional variable density image (grey scale image) photographic apparatus.
Figure 25:
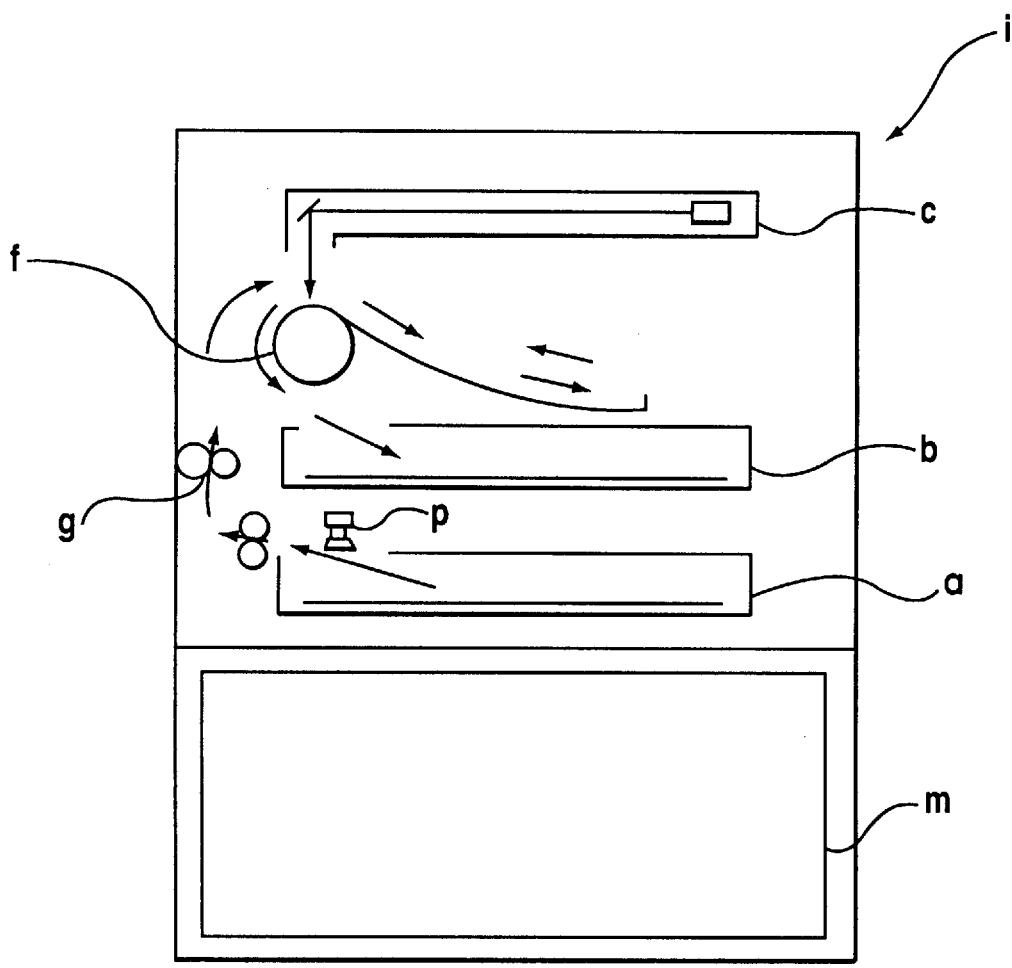
FIG. 25 is a schematic cross-sectional view of Example No. 4 of a conventional variable density image (grey scale image) photographic apparatus.
Figure 26:
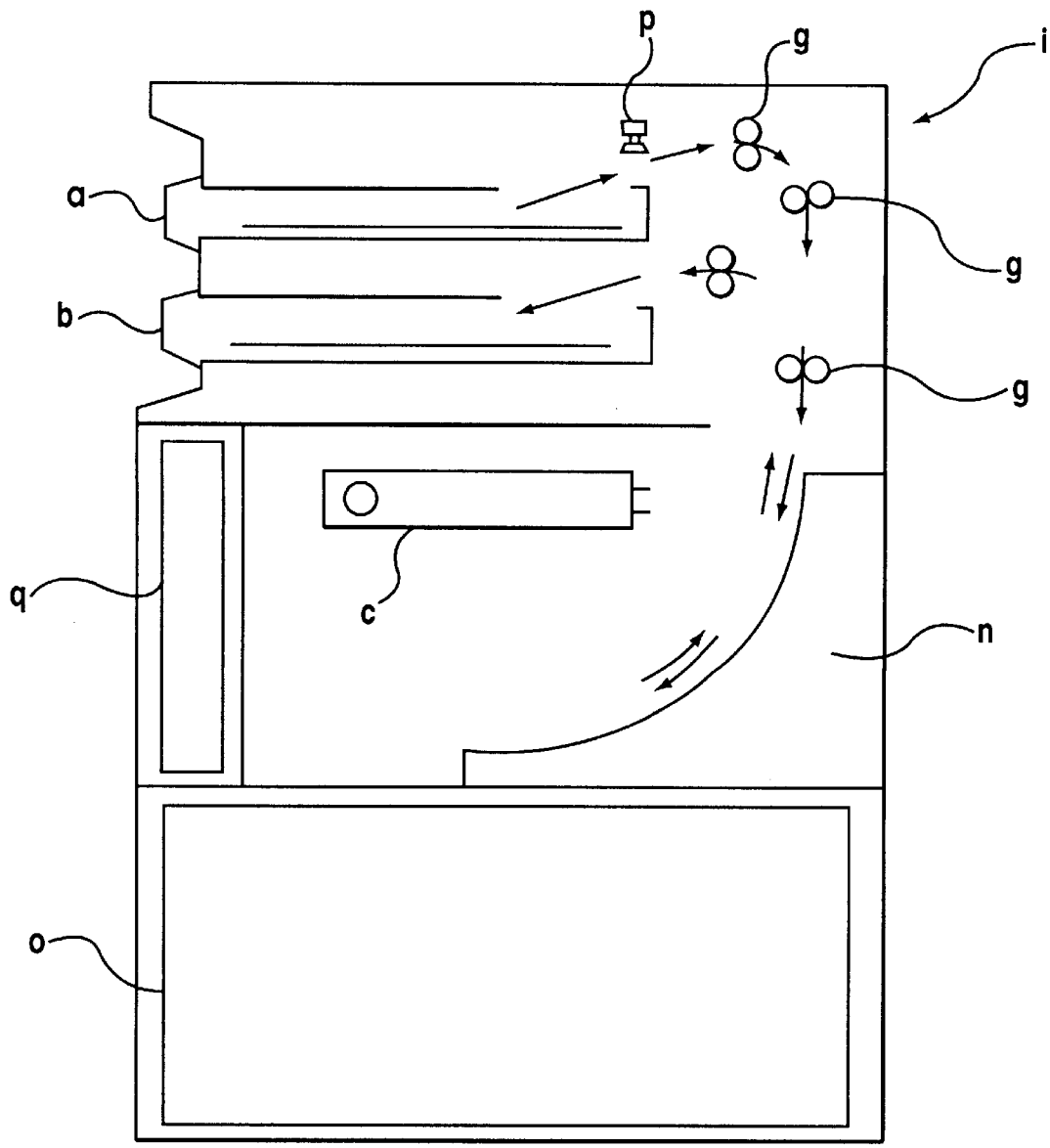
FIG. 26 is a schematic cross-sectional view of Example No. 5 of a conventional variable density image (grey scale image) photographic apparatus.

FIG. 17 shows the cross section of one embodiment, FIG. 18 shows a construction of its main part, and FIG. 19 illustrates its pick-up mechanism. In the drawings, 100 represents the main body, 110 represents the mounting part of the film feeding cassette, 120 represents the mounting part of the film retrieval cassette, 130 represents the power supply means, 140 represents the exposure means, 150 represents the image processing control means, 160 represents the pick-up mechanism, 170 represents the film conveyor means, 180 represents the vibration isolating means, A represents the variable density image (grey scale image) photographic apparatus, F represents the film, FC represents the film feeding cassette, and RC represents the film retrieval cassette.

The variable density image (grey scale image) photographic apparatus A in FIG. 17 is equipped with the mounting part 110 of the film feeding cassette FC which is mounted on the upper front part of the rectangular main body 100, the mounting part 120 of the film retrieval cassette RC which is mounted on the lower front, the power supply means 130 between the said mounting part 110 of the film feeding cassette and the said mounting part 120 of the film retrieval cassette, the exposure means 140 behind the power supply means 130 with the laser irradiation 141 heading toward the back of the main body 100, the image processing control means 150 which controls the image processing and operation of the equipment at the front of the ceiling 100a, the pick-up mechanism 160 at the ceiling in the position directly facing to the film outlet FCa of the film feeding cassette FC, the film conveyor means 170 at the back, and the vibration isolating means 180 between the mounting part 120 of the film retrieval cassette and the bottom 100b of the main body 100.

For the mounting part 110 of the film feeding cassette, it is applicable to use the device which has, for instance, the opening 111 for thrusting/pulling out of the film feeding cassette FC on the main body 100, and the supporters 112 which hold the film feeding cassette FC and enable it to slide in the direction to the back.

For the film feeding cassette FC, it is applicable to use the device which is constructed to close the shutter and shut tightly the film outlet FCa when pulling out the film feeding cassette FC from the mounting part 110, and to open the shutter and the film outlet FCa when thrusting the film feeding cassette FC into the mounting part 110. Also the mounting part 110 of the film feeding cassette has the mechanism to close/open the shutter in correspondence to the mounting motion of the film feeding cassette FC. For the film feeding cassette FC and the mounting part 110 of the film feeding cassette with the construction, the device proposed in the Japanese Patent Application No. 306466/1992, for instance, is appropriate.

The film retrieval cassette RC and the mounting part 120 of the film retrieval cassette should have the same construction as that of the above mentioned film feeding cassette FC and the mounting part 110 of the film feeding cassette.

For the exposure means 140, it is applicable to use the scanning optical system which is constructed to irradiate laser beams from the semiconductor laser unit in response to the image signal sent from the image processing control means 150, to reflect it with the polygon mirror, and to condense the reflected beams on the film surface with an fθ lens. For the exposure means 140 with the construction, the device proposed in the Japanese Patent Application No. 303104/1992, for instance, is applicable, and for its exposure controller, the device proposed in the Japanese Patent Application No. 345507/1992, for instance, is applicable.

The image processing control means 150 should be constructed to process graphic data from an X-ray CT apparatus or an MRI, generate digital graphic data with variable density, generate enlarged or reduced graphic data according to the graphic data, instruct to inscribe the image on a designated location of the film F, and control the equipment. For the image processing control means 150, it is applicable to use the apparatus with the controlling program for the other equipment, too.

For the pick-up mechanism 160, it is applicable to use a device which has a function to lift up/down and move a suction unit 161 by a lifting and moving device 162 as shown in FIGS. 18 and 19. To be more specific, it should be constructed as to hold the suction unit 161 on the arm 162 which is crossed in a horizontal direction running near the ceiling 100a of the main body 100, and move the arm 162 tracing a designated locus by the linking mechanism 163. The linking mechanism 163 should be constructed, for example, as to rotate the Number 2 component 632 centering around the fulcrum 632a by the Number 1 component 631, connect the pin 634 and the pin 633 which is placed at the end of the arm 162 to the long hole 632b formed at the end of the Number 2 component 632 through the Number 3 component (not shown), lift up/down the pin 633 along the guide groove 635, and simultaneously lift up/down the pin 634 along with the guide groove 636.

The film conveyor means 170 comprises a film forwarding mechanism 171 consisting of a pair of rollers, each positioned face to face, which picks the edge of the film F conveyed from the film feeding cassette FC by the above pick-up mechanism 160 and sends it out to the direction of the back of the main body 100, and which has a film collecting part 171a positioned facing the film F conveyed by the pick-up mechanism 160; an upper guide component 172 which changes the direction of the film F conveyed to the back through the film collecting mechanism 171 to the direction parallel with the back and has an inlet 172a and a guide face 172b positioned facing the film discharging part 171b of the above film forwarding mechanism 171; an upper forwarding mechanism 173 consisting of a pair of rollers, each positioned face to face, which has a recipient part 173a which sends the film F guided through the upper guide component 172 downward, parallel with the back, and faces the outlet 172c of the above guide face 172b; a lower forwarding mechanism 174 of the same construction positioned down from the upper forwarding mechanism 173 in a certain distance; the lower guide component 175 comprising an inlet 175a which turns the film F discharged from the lower forwarding mechanism 174 to the film retrieval cassette RC and has a guide face 175b facing the discharging part 174b of the above forwarding mechanism 174, the guide roller 175c positioned on the side of the inlet 175a of the guide face 175b of the lower guide component 175, a guide roller 175e positioned on the side of an outlet 175d; and the film retrieval mechanism 176 comprising a pair of rollers, each positioned face to face, which sends out the film F guided from the lower guide component 175 to the film retrieval cassette RC and has the recipient part 176a facing the 175d of the above guide face 175.

It is adjusted so that the laser beams from the above exposure means 140 irradiate between the upper forwarding mechanism 173 and the lower forwarding mechanism 174 of the above conveyor means 170. While exposing the film F with the exposure means 140, the front edge or the rear edge of the film F sent out from the upper forwarding mechanism 173 curls outward, i.e. in the case of the drawing, in the direction of the back of the main body 100, with discharge of the bending stress generated when the film F is bent by the guide surface 172b, resulting in unstable inscription on film. In this embodiment, therefore, a soft and pliable belt 178, a little wider than the film F, is stretched between the rear one of the rollers 173c in the upper forwarding mechanism 173 and the rear one of the rollers 174c in the lower forwarding mechanism 174, in order to prevent the edge of the film F from curling. For material with pliability, it is applicable to use, for example, polyurethane, silicon rubber, neoprene rubber, or resin or fabric of these materials (for example, woven fabric or nonwoven fabric of acetate, cotton, flax, nylon,or vinylon). It has a thickness of 0.2 to 0.5 mm and a width of approx. 400 mm. Its rubber hardness should show around 30 to 70 in scale division when measured with the spring-type hardness test machine (manufactured by Shimazu Corporation).

For the power supply means 130, a conventional device is used, and the detailed explanation of its construction, therefore, is omitted here.

For the vibration isolating means 180, several vibration isolating rubbers 181, for example, are placed at regular intervals.

As mentioned above, in this embodiment, the exposure means 140 is positioned between the film cassette FC and RC so as to inscribe on the film F by irradiating laser beams toward the back of the main body 100 where the film F is conveyed, and consequently it enables a minimization of the height of the main body to about 400 mm and the weight to about 60 kgs.

Following is a description of the procedure of exposure to the film F by the variable density image photographic apparatus A with the above mentioned configuration:

Step 101: Pick up the edge of the film F from the film feeding cassette FC through the pick-up mechanism 160, and convey it to the film forwarding mechanism 171.

Step 102: The film forwarding mechanism 171 picks the edge of the film F conveyed by the pick-up mechanism 160, and discharges it to the upper guide component 172.

Step 103: The upper guide component 172 changes the direction of the film F discharged through the film forwarding mechanism 171, and guides it to the collecting part 173a of the upper forwarding mechanism 173.

Step 104: The upper forwarding mechanism 173 sends out the guided film F downward.

Step 105: After a certain portion of the film F is sent out through the upper forwarding mechanism 173, the exposure means 140 starts exposure by irradiating laser beams.

Step 106: The exposure means 140 starts scanning in the horizontal direction at the same time when exposure starts. As the descending speed of the film F is very slow compared with the scanning speed in the horizontal direction, it can be considered that the exposure means 140 scans merely in the horizontal direction, thus bringing no practical problem in exposure.

Step 107: After completion of one scanning, the exposure means 140 stops irradiation of laser beams, and puts the position to irradiate laser beams back in its initial place.

Step 108: Step 106 and Step 107 are repeated in the fixed times, and the exposure to the film F, i.e. Inscription, is completed.

Step 109: The film F, after inscription, is collected into the film retrieval cassette RC through the lower forwarding mechanism 174, the lower guide component 175, and the film retrieval mechanism 176.

As explained above, the variable density image (grey scale image) photographic apparatus in this embodiment enables exposure of the film while it is being conveyed, and thus reduces inscription time of one cycle to about 15 seconds from 30 seconds that the conventional apparatuses require. In short, it can cut the inscription time by half.

Industrial Applicability

As mentioned above, with the variable density image (grey scale image) processing method and the variable density image processing apparatus of this invention, it is possible to extract identifying data specific to the film such as identification numbers, names of patients, or the image creation dates, from the images to be inscribed on film, enlarge the data into a size readable by the unaided eye, and inscribe it at the bottom of film, for instance. Accordingly, it effectively works for quick processing of medical film.

Also, with the variable density image (grey scale image) photographic apparatus of this invention, size and weight of the apparatus can be effectively reduced, thereby reducing space requirements. This secondary effect contributes to an efficient utilization of facilities. Furthermore, with a smaller and more light weight body, costs involved in manufacture and shipping of apparatuses are remarkably reduced. Also, in the preferable aspect of the variable density image (grey scale image) photographic apparatus in this invention, exposure to film during film conveyance is achieved and the time required for inscription is effectively reduced by half.

We claim:

1. A variable density image (grey scale image) photographic apparatus for forming a variable density image on a film supplied from a film feeding cassette by exposing a laser beam thereto, and retrieving the film into a film retrieving cassette under the film feeding cassette, said apparatus comprising:

an exposure means for projecting a laser beam to the film, said exposure means including a laser beam scanning system, and being located between the film feeding cassette and film retrieving cassette;

a film conveyor means for conveying the film from the film feeding cassette to the film retrieving cassette through a laser beam projecting area; and a control means for controlling the exposure means and film conveyor means, said control means being located above the film feeding cassette.

2. The variable density image (grey scale image) photographic apparatus of claim 1, wherein the film is exposed by said exposure means while being conveyed by said film conveyor means.

3. The variable density image (grey scale image) photographic apparatus of claim 1, wherein the film conveyor means include at least one pair of rollers stretched over a soft and pliable belt, somewhat wider than the film conveyed, on a curling side of the film.

4. The variable density image (grey scale image) photographic apparatus of claim 2, wherein the film conveyor means include at least one pair of rollers stretched over a soft and pliable belt, somewhat wider than the film conveyed, on a curling side of the film.

5. The variable density image (grey scale image) photographic apparatus of claim 3, wherein said belt passes through the laser beam projecting area.

6. The variable density image (grey scale image) photographic apparatus of claim 4, wherein said belt passes through the laser beam projecting area.

* * * * *